US009512342B1

United States Patent
Gutman

(10) Patent No.: US 9,512,342 B1
(45) Date of Patent: Dec. 6, 2016

(54) MOISTURE CURED POLYMER AND RECYCLED GLASS ROOF COATING, CAULK/SEALANT AND PATCHING COMPOUND MEMBRANES

(71) Applicant: Gardner-Gibson, Inc., Tampa, FL (US)

(72) Inventor: Israel Gutman, Wesley Chapel, FL (US)

(73) Assignee: Sun Coatings, Inc., Tampa, FL (US)

( * ) Notice: Subject to any disclaimer, the term of this patent is extended or adjusted under 35 U.S.C. 154(b) by 0 days.

(21) Appl. No.: 14/833,346

(22) Filed: Aug. 24, 2015

Related U.S. Application Data

(60) Provisional application No. 62/063,641, filed on Oct. 14, 2014.

(51) Int. Cl.
| | |
|---|---|
| C09J 183/14 | (2006.01) |
| C09D 171/00 | (2006.01) |
| C09D 183/14 | (2006.01) |
| C09D 175/04 | (2006.01) |
| C08K 3/40 | (2006.01) |
| C09J 171/00 | (2006.01) |
| C09J 175/04 | (2006.01) |
| C09J 171/02 | (2006.01) |

(52) U.S. Cl.
CPC ............... *C09J 183/14* (2013.01); *C08K 3/40* (2013.01); *C09D 171/00* (2013.01); *C09D 175/04* (2013.01); *C09D 183/14* (2013.01); *C09J 171/00* (2013.01); *C09J 171/02* (2013.01); *C09J 175/04* (2013.01)

(58) Field of Classification Search
None
See application file for complete search history.

(56) References Cited

U.S. PATENT DOCUMENTS

| | | | | |
|---|---|---|---|---|
| 4,734,479 A | * | 3/1988 | Inoue | .................... C08K 5/5465 |
| | | | | 524/379 |
| 5,236,997 A | * | 8/1993 | Fujiki | ..................... C08L 83/08 |
| | | | | 524/731 |
| 7,317,051 B2 | | 1/2008 | Georgeau et al. | |
| 7,811,636 B2 | | 10/2010 | Garfield et al. | |
| 7,858,685 B2 | | 12/2010 | Barry | |
| 8,604,160 B2 | | 12/2013 | Gerace | |
| 8,697,783 B2 | | 4/2014 | Smith | |
| 2003/0149152 A1 | * | 8/2003 | Hao | ...................... C08K 5/0025 |
| | | | | 524/435 |
| 2006/0189736 A1 | * | 8/2006 | Mori | ..................... C08L 101/10 |
| | | | | 524/404 |
| 2008/0287574 A1 | * | 11/2008 | Loth | ........................ C09D 5/34 |
| | | | | 524/35 |
| 2013/0267637 A1 | * | 10/2013 | Varkey | .................... C08G 18/12 |
| | | | | 524/270 |

FOREIGN PATENT DOCUMENTS

| | | |
|---|---|---|
| WO | 2014/114640 A1 | 7/2014 |
| WO | 2014/114643 A1 | 7/2014 |

OTHER PUBLICATIONS

Machine-generated translation of JP 2002-037969 (no date).*

* cited by examiner

*Primary Examiner* — Marc Zimmer
(74) *Attorney, Agent, or Firm* — Anthony Klemptner

(57) ABSTRACT

What is provided are compositions of matter, which comprise moisture-cured membranes comprising polymer resin binders and recycled fused glass. The membranes may be used in applications including roof coatings, caulks, patches, exterior adhesives and sealants.

18 Claims, No Drawings

MOISTURE CURED POLYMER AND RECYCLED GLASS ROOF COATING, CAULK/SEALANT AND PATCHING COMPOUND MEMBRANES

PRIORITY CLAIM

This patent application claims priority to and the benefit of the filing date of provisional patent application U.S. Ser. No. 62/063,641 filed on Oct. 14, 2014, which is incorporated herein in its entirety.

FIELD

This patent application relates to liquid-applied membranes that may be used for roof coatings, sealants, exterior adhesives, patches, and caulks.

BACKGROUND

Liquid-applied waterproofing membranes are used for various applications, including roof coatings. Roof coatings may be used to add a layer of protection to a roof or one or more roof surfaces, such as to provide protection from various elements, which may act to penetrate or erode a roofing surface. Roof coatings may serve as moisture barriers, UV ray barriers, thermal barriers, wind barriers, or other protection barriers to reduce or eliminate penetration by an element into or through one or more roofing surfaces.

Liquid roof coatings involve the application of liquid based coating to a roof. The coating cures to form an elastomeric waterproof membrane, capable of stretching and returning to its original shape without damage. These coating systems are usually reinforced with secondary materials such as plastic to provide greater tensile strength. Liquid roof coatings may be applied over a roofing surface by application techniques such as spray, brushed on, and/or roller application.

Conventional roof coatings are liquid and will evaporate to form a hard film through oxidation. However, in addition to the evaporation of water, these liquid based coatings emit volatile organic compound solvents. Due to the evaporation, these coatings often experience water based shrinkage. Conventional roof coatings tend to fade or crack frequently due to constant heat from UV rays. Thus, a composition is needed that has a high degree of moisture resistance as well as UV stability and resistance to prevent degradation of the coating surface.

Prior attempts to improve the durability of roof coatings have resulted in temporary solutions that are not cost-effective. Even though silicon membrane roof coatings have been shown to increase the durability of a coating surface, they have a short life span since they are generally not recoated or repaired. Typically, a silicone membrane system must be peeled off or destroyed and resurfaced anew. As a result, there is a need for a durable, moisture resistant and UV resistant membrane, which does not give off environmentally harmful emissions.

Polymer binder systems are known to be durable resin binder systems and have been used in formulas for caulks and sealants. Various types of non-recycled glass fillers has previously been used alongside polymer resin systems in this industry. However, coating formulations with polymer resin binders and recycled glass fillers are lacking.

SUMMARY

What is provided are compositions of matter, which comprise moisture-cured membranes comprising polymer resin binders and recycled fused glass. The membranes may be used in applications including roof coatings, caulks, patches, exterior adhesives and sealants. The use of recycled fused glass, as opposed to silica, provides unexpected results in moisture-cured membrane compounds. Use of recycled fused glass provides different properties than prior known silica. Due at least in part to being fused glass, recycled glass provides increased material strength, UV protection and insulation over compounds prior known compounds employing silica, such as silicon dioxide, fumed silica, precipitated silica, sand, glass bubbles, glass beads, glass balloons, or glass fibers.

The membranes may be applied to a surface in various thicknesses without shrinkage during curing. Surfaces that the membranes may be applied to include metals, shingles, wood, and/or asphalt. The membranes are entirely solid, elastic in nature, and moisture-resistant. The membranes cure quickly without evaporation of water or volatile organic compounds and without requiring heat. It does not contain any solvents.

The present examples use a polymer resin binder, instead of prior roof overlay compounds including ethylene propylene diene monomer (EPDM) or a thermoplastic polyolefin (TPO) with bedding cement, or prior known compounds including a hydrocarbon resin and styrene-type copolymers. The polymer resin binder acts as a catalyst within the membrane by absorbing moisture from the air and using the moisture to rapidly cure and harden the resin system. The membranes are entirely solid, elastic in nature, and moisture-resistant. As a result, the membrane has increased durability. The membranes cure quickly without evaporation of water or volatile organic compounds and without requiring heat. In various compounds disclosed herein, polymer resin binder may be a Silane-Terminated Poly Ether (STPE) polymer, a Silylated Polyurethane (SPUR) polymer, a Poly Dimethyl Siloxane (Silicone) polymer, a methyldimethoxysilylpropyloxy-terminated polyoxypropylene polymer, or functional equivalents of these polymers.

Caulks and sealants having polymer binder systems combined with silica are known to be durable resin binder products. However, it is believed that recycled fused glass has not been known in these products. In the present application, the recycled fused glass added to the composition provides unexpected results including enhanced UV protection and increased tensile strength. The recycled fused glass enhances the durability of the resin system and increases the affinity between the resin system and the recycled fused glass, so that the cohesiveness of the polymer to the recycled glass is more uniform than prior known compounds employing silica, such as silicon dioxide, aluminum silicate, fumed silica, precipitated silica, sand, glass bubbles, glass beads, glass balloons, or glass fibers. Due to cohesiveness of the recycled glass fillers to the polymer resin binders, the durability of the membrane increases, resulting in membranes with greater insulation, moisture resistance and UV stability. In this manner, the products may better withstand exterior use. Other unexpected results and benefits of using the recycled glass filler include increased fire resistance and solar reflectivity. Further, the recycled fused glass makes it easier to recoat and repair the membrane roof coatings.

The recycled fused glass also aids in making the membrane more energy efficient and environmentally friendly. The moisture-cured membrane may make a roof more energy efficient by increasing the amount of reflectivity in the roof coating. Further, the use of recycled glass offers the user a greater ability to achieve Leadership in Energy & Environmental Design (LEED) credits for using recycled materials. Additionally, the membrane does not contain any solvents or volatile organic compounds nor does the membrane give off any ozone depleting emissions into the atmosphere when it dries. Since there is no loss of membrane material due to evaporation, water based shrinkage is avoided and less membrane material is needed to coat a surface.

Various examples comprise polymer resin binders, recycled glass fillers, UV absorbers and stabilizers, rheology modifiers, pigments, crosslinkers, plasticizers, moisture control agents, adhesion promoters, catalysts, calcium carbonate fillers, kaolin clay fillers, silicate fillers, and silica fillers for applications including roof coatings, sealants, exterior adhesives, and caulks. Patching compound membranes may include polymer resin binders, recycled glass fillers, UV absorbers and stabilizers, rheology modifiers, pigments, plasticizers, crosslinkers, moisture control agents, adhesion promoters, catalysts, calcium carbonate fillers, kaolin clay fillers, silicate fillers, and silica fillers. The caulk/sealant membranes may include polymer resin binders, recycled glass fillers, UV absorbers and stabilizers, rheology modifiers, pigments, plasticizers, crosslinkers, moisture control agents, water repellants, adhesion promoters, catalysts, calcium carbonate fillers, precipitated calcium carbonate fillers, and silica fillers. The roof coating membranes may include polymer resin binders, recycled glass fillers, UV absorbers and stabilizers, rheology modifiers, pigments, plasticizers, crosslinkers, moisture control agents, adhesion promoters, catalysts, calcium carbonate fillers, Barium Sulfate fillers, and silica fillers.

DETAILED DESCRIPTION

In the following detailed description, numerous specific details are set forth in order to provide a thorough understanding of the examples as defined in the claimed subject matter, and as an example of how to make and use the examples described herein. However, it will be understood by those skilled in the art that claimed subject matter is not intended to be limited to such specific details, and may even be practiced without requiring such specific details. In other instances, well-known methods, procedures, and components have not been described in detail so as not to obscure the invention defined by the claimed subject matter.

What is provided are membrane compositions of matter comprised of polymer resin binders, recycled glass fillers, UV absorbers and stabilizers, rheology modifiers, pigments, crosslinkers, plasticizers, moisture control agents, adhesion promoters, catalysts, calcium carbonate fillers, kaolin clay fillers, silicate fillers, silica fillers, and water repellants. The membranes are liquid-applied and moisture-cured. The formulation of the membrane is entirely solid and elastic in nature, and may stretch up to approximately 300% of its original size. The elongation and stretching of the membrane is beneficial since the membrane will stretch rather than crack with structure movements or imperfections in a building or roof. The membrane is moisture resistant since it creates an impervious layer, which will not allow water to penetrate.

The polymer resin binder acts as a catalyst within the system by absorbing moisture from the air and using the moisture to rapidly cure and harden the resin system. As a result, the membrane has increased durability. The present membrane does not require heat for curing, but instead moisture cures due to the polymer resin binder.

The incorporation of a recycled glass filler enhances the durability of each resin system. In one or more examples, the recycled glass filler consists of fused silica that is finely ground into a particle size of substantially between 3 and 20 microns. This particle size of the present examples provides better overall physical characteristics, over using larger particle sizes, such as merely using crushed glass or that having particle sizes of 0.001 mm to about 1.0 mm.

The use of recycled glass fillers in the membranes offer several benefits over non-recycled glass, including stronger affinity between the resin systems and the glass, so that the cohesiveness of the polymer to the recycled glass is more uniform. The stronger affinity is mainly due to the strong interaction between the fused silica in the recycled glass and silicone found in the polymer and due to the optimization of the particle size of the recycled glass. The strength of the coating provides increased insulation, moisture resistance, fire resistance, and solar reflectivity. Some unexpected benefits of using the recycled glass filler include about a 75% increase in tensile strength over non-recycled glass and increased UV stability of the polymer to allow products to better withstand exterior use.

For example, testing of methyldimethoxysilylpropyloxy-terminated polyoxypropylene, silicone, poly ether and polyurethane caulks incorporating recycled fused glass (compared with equivalent products not having recycled fused glass) provided increased tensile strength by approximately 76%. QUV weathering for gloss and color deviation was substantially improved over products not containing recycled fused glass. Testing results for the caulk compositions are summarized in the chart below. The compositions designated as "W" have recycled fused glass and those designated "WO" do not. Each formulation is otherwise equivalent. All testing was conducted by ASTM test methods, as noted below.

| Test Description | ASTM Test Method | Methyldimethoxysilylpropyloxy-terminated polyoxypropylene | | Silicone | | Poly Ether | | Polyurethane | |
|---|---|---|---|---|---|---|---|---|---|
| | | WO | W | WO | W | WO | W | WO | W |
| Tensile Strength | D412 | 180 psi | 315 psi | 170 psi | 300 psi | 190 psi | 333 psi | 170 psi | 305 psi |
| Elongation | D412 | 250% | 255% | 250% | 260% | 255% | 265% | 270% | 275% |
| Tear Resistance | D624/Die C | 30 lb/f | 41 lb/f | 27 lb/f | 40 lb/f | 31 lb/f | 44 lb/f | 34 lb/f | 47 lb/f |
| Permeability (US Perms) | E96/Procedure B | 5 | 3 | 5 | 3 | 4 | 3 | 3 | 2 |
| Hardness (Shore D Units) | D2240 | 29 | 37 | 27 | 37 | 31 | 40 | 33 | 42 |
| QUV Weathering Gloss Deviation | D4329 (5000 hrs. Exposure) | $\Delta$ −18 | $\Delta$ −5 | $\Delta$ −8 | $\Delta$ −3 | $\Delta$ −14 | $\Delta$ −6 | $\Delta$ −7 | $\Delta$ −3 |
| QUV Weathering Color Deviation | D4329 (5000 hrs. Exposure) | $\Delta E$ 4.3 | $\Delta E$ 1.7 | $\Delta E$ 1.3 | $\Delta E$ 0.6 | $\Delta E$ 2.9 | $\Delta E$ 0.6 | $\Delta E$ 1.5 | $\Delta E$ 0.6 |

The caulk compositions achieved an average of 4% greater elongation than those without recycled fused glass.

Similarly, for patching compounds having recycled fused glass, testing was completed according to ASTM testing methods for methyldimethoxysilylpropyloxy-terminated polyoxypropylene, silicone, poly ether and polyurethane patching compounds (compared with equivalent products not having recycled fused glass). Tensile strength improved on average by greater than 70% over products not containing the recycled fused glass. Testing results for the caulk compositions are summarized in the chart below. The compositions designated as "W" have recycled fused glass and those designated "WO" do not. Each formulation is otherwise equivalent. All testing was conducted by ASTM test methods, as noted below.

| Test Description | ASTM Test Method | Methyldimethoxysilylpropyloxy-terminated polyoxypropylene | | Silicone | | Poly Ether | | Polyurethane | |
|---|---|---|---|---|---|---|---|---|---|
| | | WO | W | WO | W | WO | W | WO | W |
| Tensile Strength | D412 | 200 psi | 350 psi | 200 psi | 375 psi | 220 psi | 385 psi | 220 psi | 375 psi |
| Elongation | D412 | 225% | 255% | 230 % | 260% | 265 % | 275% | 220% | 260% |
| Tear Resistance | D624/Die C | 31 lb/f | 35 lb/f | 31 lb/f | 33 lb/f | 30 lb/f | 35 lb/f | 35 lb/f | 40 lb/f |
| Permeability (US Perms) | E96/Procedure B | 3 | 2 | 3 | 2 | 4 | 2 | 3 | 2 |
| Hardness (Shore D Units) | D2240 | 30 | 39 | 31 | 39 | 30 | 41 | 35 | 46 |
| QUV Weathering Gloss Deviation | D4329 (5000 hrs. Exposure) | Δ −25 | Δ −10 | Δ −5 | Δ −2 | Δ −18 | Δ −9 | Δ −9 | Δ −4 |
| QUV Weathering Color Deviation | D4329 (5000 hrs. Exposure) | ΔE 5.5 | ΔE 2.0 | ΔE 1.4 | ΔE 0.6 | ΔE 3.2 | ΔE 0.8 | ΔE 1.5 | ΔE 0.5 |

In all cases for the patching compounds, QUV weathering for gloss and color deviation was substantially improved by use of the recycled fused glass.

Similarly, for coating compositions having recycled fused glass, testing was completed according to ASTM testing methods for methyldimethoxysilylpropyloxy-terminated polyoxypropylene, silicone, poly ether and polyurethane patching compounds (compared with equivalent products not having recycled fused glass). Tensile strength improved on average by greater than 70% over products not containing the recycled fused glass. Testing results for the coating compositions are summarized in the chart below. The compositions designated as "W" have recycled fused glass and those designated "WO" do not. Each formulation is otherwise equivalent. All testing was conducted by ASTM test methods, as noted below.

| Test Description | ASTM Test Method | Methyldimethoxysilylpropyloxy-terminated polyoxypropylene | | Silicone | | Poly Ether | | Polyurethane | |
|---|---|---|---|---|---|---|---|---|---|
| | | WO | W | WO | W | WO | W | WO | W |
| Tensile Strength | D412 | 200 psi | 350 psi | 200 psi | 375 psi | 220 psi | 385 psi | 220 psi | 375 psi |
| Elongation | D412 | 225% | 255% | 230 % | 260% | 265 % | 275% | 220% | 260% |
| Tear Resistance | D624/Die C | 31 lb/f | 35 lb/f | 31 lb/f | 33 lb/f | 30 lb/f | 35 lb/f | 35 lb/f | 40 lb/f |
| Permeability (US Perms) | E96/Procedure B | 3 | 2 | 3 | 2 | 4 | 2 | 3 | 2 |
| Hardness (Shore D Units) | D2240 | 30 | 39 | 31 | 39 | 30 | 41 | 35 | 46 |
| QUV Weathering Gloss Deviation | D4329 (5000 hrs. Exposure) | Δ −25 | Δ −10 | Δ −5 | Δ −2 | Δ −18 | Δ −9 | Δ −9 | Δ −4 |
| QUV Weathering Color Deviation | D4329 (5000 hrs. Exposure) | ΔE 5.5 | ΔE 2.0 | ΔE 1.4 | ΔE 0.6 | ΔE 3.2 | ΔE 0.8 | ΔE 1.5 | ΔE 0.5 |

Each formulation having recycled fused glass achieved an average of 4% greater elongation than those without it. In all cases, QUV weathering for gloss and color deviation was substantially improved over those products that did not contain recycled fused glass.

The recycled glass filler also aids in making the membrane more energy efficient and environmentally friendly. In one example, the moisture-cured membrane makes a roof more energy efficient by increasing the amount of reflectivity in the roof coating. Further, the use of recycled glass offers the user a greater ability to achieve Leadership in Energy & Environmental Design (LEED) credits for using recycled materials. The number of LEED credits for the user increases with a higher percentage of recycled materials used in the product.

Additionally, the membrane does not contain any solvents or volatile organic compounds nor does the membrane give off any ozone depleting emissions into the atmosphere when it dries. Unlike prior known compositions including hydrocarbon resin, a copolymer selected from styrene-isoprene-styrene block copolymers, styrene-butadiene-styrene block copolymers, and styrene-ethylene/butylene-styrene block copolymers, and a glass filler material, the present examples do not contain solvents and are not solvent based. Since there is no loss of membrane material due to evaporation, water based shrinkage is avoided and less membrane material is needed to coat a surface.

In one or more embodiments, the membrane of this invention reflects approximately 80% of UV rays when applied to a roof coating. Typically, the recycled glass, titanium dioxide, and calcium carbonate components are primarily responsible for reflecting the UV rays from the coating. As a result, less heat is generated and less air conditioning is need to cool the building with the membrane.

In various embodiments, the membrane allows for recoating and repair, if needed, since most sealants and caulks will adhere to the membrane with strong affinity. Thus, money and time will be saved by not needing to resurface anew each time. The membrane may be applied to various surfaces by application techniques such as painting, spraying, rolling, brushing, pouring, and/or distributing through a tube. The surfaces may commonly be composed of metals, shingles, wood, and/or asphalt. The membrane may be applied to both new and existing surfaces.

The membrane does not need to be evenly applied since it becomes self-leveling upon application to the surface. In one embodiment, the membrane may be applied by adding a small application of up to approximately 6 inches thick. In some embodiments, the thickness of the membrane will be between 1/1,000,000 inch thick and 8 inches thick. Generally, the membrane cannot be applied to the surface with water or silicone. The membrane may be applied in a single application and does not require multiple applications to achieve a desired coating thickness.

Drying time for the various examples herein is less than prior known compounds not employing polymer resin binding systems. Drying time for the present compounds is approximately 12 hours at 50% relative humidity.

The membrane of this invention may be formulated for various applications. Some of the applications of the membrane include roof coatings, construction sealants, exterior adhesives, patches, and caulk.

In the various examples described herein, recycled fused glass may be in an amount of substantially between 20% to 25% by weight of the composition. This amount of recycled fused glass is important to the composition because it provides better overall physical characteristics, than using substantially smaller amounts of recycled glass (such as but not limited to only including 0-10% by weight of the composition).

Patching Compound Composition Examples

One or more white patching compound membrane examples include polymer resin binders, recycled glass fillers, UV absorbers and stabilizers, rheology modifiers, pigments, plasticizers, crosslinkers, moisture control agents, adhesion promoters, catalysts, calcium carbonate fillers, kaolin clay fillers, silicate fillers, and silica fillers. The polymer resin binder may be a Silane-Terminated Poly Ether (STPE) polymer, a Silylated Polyurethane (SPUR) polymer, a Poly Dimethyl Siloxane (Silicone) polymer, a methyldimethoxysilylpropyloxy-terminated polyoxypropylene polymer, or functional equivalents of these polymers. The polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known patching compounds that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The UV absorber may be benzotriazole or functional equivalents of this UV absorber. The absorption of UV rays increases the membrane's durability and impermeability by enhancing the protection of one or more polymer resin binders, including the STPE and methyldimethoxysilylpropyloxy-terminated polyoxypropylene polymers. The UV stabilizer may be decanedioic acid, bis (2,2,6,6-tetramethyl-4-piperidinyl) ester or functional equivalents of this UV stabilizer. Use of the UV stabilizer protects the membrane from long-term degradation. One or more example membranes may have an 84% reflectivity of UV rays due to the use of the recycled glass, UV absorber, and UV stabilizer.

The moisture control agent may be vinyltrimethoxysilane or functional equivalents of this moisture control agent. The moisture control agent acts as a safeguard to prevent the membrane from drying before its application to a surface.

The rheology modifier may be a micronized amide wax or functional equivalents of this rheology modifier. Use of the rheology modifier controls the viscosity of the membrane, such that the membrane remains self-leveling upon application to the surface. The rheology modifier will alter the viscosity of the membrane for one or more desired applications, including exterior adhesives and patches.

The adhesion promoter may be N(beta-aminoethyl) gammaaminopropyltrimethoxysilane or Gamma-Aminopropyltrimethoxysilane or functional equivalents of these adhesion promoters. The adhesion promoter acts to enhance the adhesion of coatings or adhesives within the membrane.

The catalyst may be dibutyltin dilaurate, dioctyltin dilaurate, or dibutyltin diacetylacetonate, or functional equivalents of these catalysts. The catalyst reduces the curing and drying time of the membrane.

One or more patching compounds may be white patching compounds. The pigment may be titanium dioxide or equivalents of this pigment. The pigment provides the commercially desired coloration characteristics to the membrane. In one or more embodiments, the color may be white to better reflect UV rays from the membrane.

The plasticizer may be dinonyl phthalate, poly propylene glycol, poly dimethyl siloxane, or functional equivalents of this plasticizer. The plasticizer interacts with the polymer resin binder to enhance the plasticity and flexibility of the membrane.

The crosslinker may be methyl tris(MEKO) silane or N-ethyl-3-aminoisobutyl trimethoxysilane; N-ethylamino isobutyltrimethoxysilane or functional equivalents of these crosslinkers. Use of the crosslinker enhances interactions between the materials of the membrane.

The calcium carbonate filler may comprise limestone, ground silica or other functionally equivalent minerals. The calcium carbonate filler increases the absorption of the membrane. The kaolin clay filler acts to improve the setting rates of the membrane. The silica filler may be fumed silica or precipitated silica or other functionally equivalent forms of silica. Both the fumed silica and precipitated silica serve add strength and support to the membrane. The silicate filler may be aluminum silicate or other functional equivalents of the silicate filler. The silicate filler thickens the liquid membrane for easier application.

STPE Polymer Moisture Cured Patching Compound Membrane Example

One or more white patching membrane examples may include a Silane-Terminated Poly Ether (STPE) moisture cured membrane. This patching compound membrane example includes a polymer resin binder, a recycled glass filler, a UV absorber, a UV stabilizer, a rheology modifier, a calcium carbonate filler, a precipitated calcium carbonate filler, a kaolin clay filler, a precipitated silica filler, a pigment, a plasticizer, a moisture control agent, an adhesion promoter, and a catalyst.

The STPE polymer resin binder acts to bind the patching compound membrane components and as a catalyst within the system that absorbs moisture to harden the membrane into a solid, curing it without evaporation of water or volatile organic compounds and without requiring heat application. As a result, the membrane is more durable than previously known patching compounds that do not contain a STPE polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a UV absorber, benzotriazole. Other UV absorbers are possible within the scope and spirit of this application. The absorption of UV rays by the UV absorber increases the membrane's durability and impermeability by enhancing the protection of the STPE polymer. The membrane in this example includes a UV stabilizer, decanedioic acid, bis (2,2,6,6-tetramethyl-4-piperidinyl) ester. Other UV stabilizers are possible within the scope and spirit of this application. Use of the UV stabilizer protects the membrane from long-term degradation. One or more examples of the exterior roof patching compound membranes described in this application may qualify for a Cool Roof Rating Council designation of a "cool" roof, meaning that it is of sufficient solar reflectance and thermal emittance (radiative properties). One or more example membranes may have an 84% reflectivity of UV rays due to the use of the recycled glass, UV absorber and UV stabilizer.

The membrane in this particular example includes a moisture control agent, vinyltrimethoxysilane. Other moisture agents are possible within the scope and spirit of this application. The moisture control agent acts as a safeguard to prevent the membrane from drying before its application to a surface.

The membrane in this example include a rheology modifier, micronized amide wax. Other rheology modifiers are possible within the scope and spirit of this application. Use of the rheology modifier controls the viscosity of the membrane, such that the membrane remains self-leveling upon application to the surface. The rheology modifier may alter the viscosity of the membrane for one or more desired applications, including exterior adhesives and patches.

Further, the membrane in this example includes an adhesion promoter, N(beta-aminoethyl) gammaaminopropyltrimethoxysilane. Other adhesion promoters are possible within the scope and spirit of this application. The adhesion promoter acts to enhance the adhesion of coatings or adhesives within the membrane.

The membrane in this particular example includes a catalyst, dibutyltin dilaurate. Other catalysts are possible within the scope and spirit of this application. The catalyst reduces the curing and drying time of the membrane.

The membrane in this example also includes a pigment, titanium dioxide. Other pigments or no pigment at all are possible within the scope and spirit of this application. The pigment provides the commercially desired coloration characteristics to the membrane. In one or more embodiments, the color may be white to better reflect UV rays from the membrane.

The membrane in this example includes a plasticizer, dinonyl phthalate. Other plasticizers are possible within the scope and spirit of this application. The plasticizer interacts with the polymer resin binder to enhance the plasticity and flexibility of the membrane.

The membrane in this particular example includes a calcium carbonate filler and a precipitated calcium carbonate filler. The calcium carbonate filler may comprise limestone, ground silica, or other functionally equivalent minerals. The calcium carbonate filler increases the absorption of the membrane. The membrane in this example also includes a kaolin clay filler, which acts to improve the setting rates of the membrane. The membrane in this example includes a precipitated silica filler, which adds strength and support to the membrane. Other fillers are possible within the scope and spirit of this application, and some STPE examples may include only recycled glass as a filler without the use of additional fillers.

An example white patching compound formulation with an STPE polymer resin includes:

| Material Type | Material Name | Range % by Weight |
|---|---|---|
| Polymer | Silane-Terminated Poly Ether | 30.00-35.00 |
| UV Absorber | Benzotriazole | 0.05-0.10 |
| UV Stabilizer | Decanedioic acid, bis (2,2,6,6-tetramethyl-4-piperidinyl) ester | 0.05-0.10 |
| Rheology Modifier | Micronized Amide Wax | 0.50-1.00 |
| Filler | Calcium Carbonate | 20.00-25.00 |
| Filler | Recycled Glass | 20.00-25.00 |
| Filler | Precipitated Calcium Carbonate | 15.00-17.00 |
| Filler | Kaolin Clay | 4.00-7.00 |
| Filler | Precipitated Silica | 0.30-0.50 |
| Pigment | Titanium Dioxide | 2.00-3.00 |
| Plasticizer | Dinonyl Pthalate | 2.00-3.00 |
| Moisture Control | Vinyltrimethoxysilane | 1.00-2.00 |
| Adhesion Promoter | N(beta-aminoethyl) Gammaaminopropyltrimethoxysilane | 0.75-1.00 |
| Catalyst | Dibutyltin Dilaurate | 0.01-0.03 |

Another example white patching compound formulation with an STPE polymer resin comprises:

| Material Type | Material Name | % Wt. | % Volume |
|---|---|---|---|
| Polymer | Silane-Terminated Poly Ether | 31.64 | 52.85 |
| UV Absorber | Benzotriazole | 0.07 | 0.10 |
| UV Stabilizer | Decanedioic acid, bis (2,2,6,6-tetramethyl-4-piperidinyl) ester | 0.07 | 0.12 |
| Rheology Modifier | Micronized Amide Wax | 0.52 | 0.84 |
| Filler | Calcium Carbonate | 20.38 | 12.18 |
| Filler | Recycled Glass | 20.38 | 12.70 |
| Filler | Precipitated Calcium Carbonate | 15.04 | 9.03 |
| Filler | Kaolin Clay | 4.89 | 3.01 |
| Filler | Precipitated Silica | 0.37 | 1.00 |
| Pigment | Titanium Dioxide | 2.22 | 0.90 |
| Plasticizer | Dinonyl Pthalate | 2.59 | 4.31 |
| Moisture Control | Vinyltrimethoxysilane | 1.04 | 1.73 |
| Adhesion Promoter | N(beta-aminoethyl) Gammaaminopropyltrimethoxysilane | 0.78 | 1.22 |
| Catalyst | Dibutyltin Dilaurate | 0.01 | 0.01 |

In at least one embodiment of this example, the viscosity of the membrane is substantially between 200 and 220 penetration units and the weight per gallon is substantially between 13.4 and 13.6.

Methyldimethoxysilylpropyloxy-Terminated Polyoxypropylene Moisture Cured Patching Compound Membrane Example One or more white patching membrane examples may include a methyldimethoxysilylpropyloxy-terminated polyoxypropylene moisture cured membrane. This patching compound membrane example includes a polymer resin binder, a recycled glass filler, a UV absorber, a UV stabilizer, a rheology modifier, a calcium carbonate filler, a precipitated silica filler, an aluminum silicate filler, a pigment, a plasticizer, a moisture control agent, an adhesion promoter, and a catalyst. The methyldimethoxysilylpropyloxy-terminated polyoxypropylene polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known patching compounds that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The patching compound membrane, in this particular example, also includes a UV absorber, benzotriazole. Other UV absorbers are possible within the scope and spirit of this application. The absorption of UV rays increases the membrane's durability and impermeability by enhancing the protection of the methyldimethoxysilylpropyloxy-terminated polyoxypropylene polymer. The membrane in this example includes a UV stabilizer, decanedioic acid, bis (2,2,6,6-tetramethyl-4-piperidinyl) ester. Other UV stabilizers are possible within the scope and spirit of this application. Use of the UV stabilizer protects the membrane from long-term degradation. One or more examples of the exterior roof patching compound membranes herein may qualify for a Cool Roof Rating Council designation of a "cool" roof, meaning that it is of sufficient solar reflectance and thermal emittance (radiative properties). One or more example membranes may have an 84% reflectivity of UV rays due to the use of the recycled glass, UV absorber and UV stabilizer The membrane in this particular example includes a moisture control agent, vinyltrimethoxysilane. Other moisture control agents are possible within the scope and spirit of this application. The moisture control agent acts as a safeguard to prevent the membrane from drying before its application to a surface.

The membrane in this example includes a rheology modifier, micronized amide wax. Other rheology modifiers are possible within the scope and spirit of this application. Use of the rheology modifier controls the viscosity of the membrane, such that the membrane remains self-leveling upon application to the surface. The rheology modifier may alter the viscosity of the membrane for one or more desired applications, including exterior adhesives and patches.

Further, the membrane in this example includes an adhesion promoter, N(beta-aminoethyl) gammaaminopropyltrimethoxysilane. Other adhesion promoters are possible within the scope and spirit of this application. The adhesion promoter acts to enhance the adhesion of coatings or adhesives within the membrane.

The membrane in this particular example includes a catalyst, dibutyltin diacetylacetonate. Other catalysts are possible within the scope and spirit of this application. The catalyst reduces the curing and drying time of the membrane.

The membrane in this example also includes a pigment, titanium dioxide. Other pigments, or no pigment at all, are possible within the scope and spirit of this application. The pigment provides the commercially desired coloration characteristics to the membrane. In one or more embodiments, the color may be white to better reflect UV rays from the membrane.

The membrane in this example includes a plasticizer, dinonyl phthalate. Other plasticizers are possible within the scope and spirit of this application. The plasticizer interacts with the polymer resin binder to enhance the plasticity and flexibility of the membrane.

The membrane in this particular example includes a calcium carbonate filler. The calcium carbonate filler may comprise limestone, ground silica, or other functionally equivalent minerals. The calcium carbonate filler increases the absorption of the membrane. The membrane in this example also includes a precipitated silica filler, which adds strength and support to the membrane. Additionally, the membrane in this example includes a silicate filler, wherein the silicate filler is aluminum silicate. The aluminum silicate is used to increase the temperature resistance of the membrane. Other fillers or the use of recycled glass alone as the filler are possible within the scope and spirit of this MS application.

An example white patching compound formulation with an MS polymer resin includes:

| Material Type | Material Name | Range % by Weight |
| --- | --- | --- |
| Polymer | Methoxy Silane | 30.00-35.00 |
| UV Absorber | Benzotriazole | 0.10-0.20 |
| UV Stabilizer | Decanedioic acid, bis (2,2,6,6-tetramethyl-4-piperidinyl) ester | 0.10-0.20 |
| Rheology Modifier | Micronized Amide Wax | 0.50-1.00 |
| Filler | Calcium Carbonate | 20.00-25.00 |
| Filler | Recycled Glass | 20.00-24.00 |
| Filler | Precipitated Silica | 0.50-1.00 |
| Filler | Aluminum Silicate | 2.00-3.00 |
| Pigment | Titanium Dioxide | 6.00-8.00 |
| Plasticizer | Dinonyl Pthalate | 8.00-9.00 |
| Moisture Control | Vinyltrimethoxysilane | 0.75-1.50 |
| Adhesion Promoter | N(beta-aminoethyl) Gammaaminopropyltrimethoxysilane | 2.00-3.00 |
| Catalyst | Dibutyltin Diacetylacetonate | 0.20-0.40 |

An example white patching compound formulation with a methyldimethoxysilylpropyloxy-terminated polyoxypropylene polymer resin includes:

| Material Type | Material Name | Range % by Weight |
| --- | --- | --- |
| Polymer | Methyldimethoxysilylpropyloxy-terminated polyoxypropylene | 30.00-35.00 |
| UV Absorber | Benzotriazole | 0.10-0.20 |
| UV Stabilizer | Decanedioic acid, bis (2,2,6,6-tetramethyl-4-piperidinyl) ester | 0.10-0.20 |
| Rheology Modifier | Micronized Amide Wax | 0.50-1.00 |
| Filler | Calcium Carbonate | 20.00-25.00 |
| Filler | Recycled Glass | 20.00-24.00 |
| Filler | Precipitated Silica | 0.50-1.00 |
| Filler | Aluminum Silicate | 2.00-3.00 |
| Pigment | Titanium Dioxide | 6.00-8.00 |
| Plasticizer | Dinonyl Pthalate | 8.00-9.00 |
| Moisture Control | Vinyltrimethoxysilane | 0.75-1.50 |
| Adhesion Promoter | N(beta-aminoethyl) Gammaaminopropyltrimethoxysilane | 2.00-3.00 |
| Catalyst | Dibutyltin Diacetylacetonate | 0.20-0.40 |

Another example white patching compound formulation with a methyldimethoxysilylpropyloxy-terminated polyoxypropylene polymer resin includes:

| Material Type | Material Name | % Wt. | % Volume |
| --- | --- | --- | --- |
| Polymer | Methyldimethoxysilylpropyloxy-terminated polyoxypropylene | 31.87 | 48.50 |
| UV Absorber | Benzotriazole | 0.14 | 0.18 |
| UV Stabilizer | Decanedioic acid, bis (2,2,6,6-tetramethyl-4-piperidinyl) ester | 0.14 | 0.21 |
| Rheology Modifier | Micronized Amide Wax | 0.56 | 0.84 |
| Filler | Calcium Carbonate | 25.01 | 13.91 |
| Filler | Recycled Glass | 20.07 | 11.64 |
| Filler | Precipitated Silica | 0.88 | 2.22 |
| Filler | Aluminum Silicate | 2.47 | 1.44 |
| Pigment | Titanium Dioxide | 6.69 | 2.52 |
| Plasticizer | Dinonyl Pthalate | 8.44 | 13.07 |
| Moisture Control | Vinyltrimethoxysilane | 0.96 | 1.49 |
| Adhesion Promoter | N(beta-aminoethyl) Gammaaminopropyltrimethoxysilane | 2.47 | 3.61 |
| Catalyst | Dibutyltin Diacetylacetonate | 0.30 | 0.37 |

In at least one embodiment of this example, the viscosity of the membrane is between 200 and 220 penetration units and the weight per gallon is between 13.00 and 13.25.

SPUR Polymer Moisture Cured Patching Compound Membrane Example

One or more white patching membrane examples may include a Silylated Polyurethane (SPUR) moisture cured membrane. This patching compound membrane example includes a SPUR polymer resin binder, a recycled glass filler, a UV stabilizer, a rheology modifier, a calcium carbonate filler, a fumed silica filler, a pigment, a plasticizer, a crosslinker, an adhesion promoter, and a catalyst. The SPUR polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known patching compounds that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a UV stabilizer, decanedioic acid, bis (2,2,6,6-tetramethyl-4-piperidinyl) ester. Other UV stabilizers are possible within the scope and spirit of this application. Use of the UV stabilizer protects the membrane from long-term degradation. One or more examples of the exterior roof patching compound membranes herein may qualify for a Cool Roof Rating Council designation of a "cool" roof, meaning that it is of sufficient solar reflectance and thermal emittance (radiative properties).

The membrane in this example includes a rheology modifier, micronized amide wax. Other rheology modifiers are possible within the scope and spirit of this application. Use of the rheology modifier controls the viscosity of the membrane, such that the membrane remains self-leveling upon application to the surface. The rheology modifier may alter the viscosity of the membrane for one or more desired applications, including exterior adhesives and patches.

Further, the membrane in this example include an adhesion promoter, gamma-aminopropyltrimethoxysilane. Other adhesion promoters are possible within the scope and spirit of this application. The adhesion promoter acts to enhance the adhesion of coatings or adhesives within the membrane.

The membrane in this particular example includes a catalyst, dioctyltin dilaurate. Other catalysts are possible within the scope and spirit of this application. The catalyst reduces the curing and drying time of the membrane.

The membrane in this example also includes a pigment, titanium dioxide. Other pigments or no pigment at all are possible within the scope and spirit of this application. The pigment provides the commercially desired coloration characteristics to the membrane. In one or more embodiments, the color may be white to better reflect UV rays from the membrane.

The membrane in this example includes a plasticizer, poly propylene glycol. Other plasticizers are possible within the scope and spirit of this application. The plasticizer interacts with the polymer resin binder to enhance the plasticity and flexibility of the membrane.

The membrane in this example also includes a crosslinker, N-ethyl-3-aminoisobutyl trimethoxysilane; N-ethylamino isobutyltrimethoxysilane. Other crosslinkers are possible within the scope and spirit of this application. Use of the crosslinker enhances interactions between the materials of the membrane.

The membrane in this particular example includes a calcium carbonate filler. The calcium carbonate filler may comprise limestone, ground silica, or other functionally equivalent minerals. The calcium carbonate filler increases the absorption of the membrane. The membrane in this example also includes a fumed silica filler, which adds strength and stability to the membrane. Other fillers or the use of recycled glass alone as a filler are possible within the scope and spirit of this SPUR application.

An example white patching compound formulation with an SPUR polymer resin includes:

| Material Type | Material Name | Range % by Weight |
|---|---|---|
| Polymer | Silylated Polyurethane | 30.00-35.00 |
| UV Stabilizer | Decanedioic acid, bis (2,2,6,6-tetramethyl-4-piperidinyl) ester | 0.75-1.00 |
| Rheology Modifier | Micronized Amide Wax | 0.75-1.00 |
| Filler | Calcium Carbonate | 30.00-35.00 |
| Filler | Recycled Glass | 20.00-25.00 |
| Filler | Fumed Silica | 0.50-1.00 |
| Pigment | Titanium Dioxide | 1.00-3.00 |
| Plasticizer | Poly Propylene Glycol | 8.00-9.00 |
| Crosslinker | N-Ethyl-3-aminoisobutyl trimethoxysilane;N-Ethylamino isobutyltrimethoxysilane | 1.00-3.00 |
| Adhesion Promoter | Gamma-Aminopropyltrimethoxysilane | 0.25-0.75 |
| Catalyst | Dioctyltin Dilaurate | 0.10-0.30 |

Another example white patching compound formulation with an SPUR polymer resin includes:

| Material Type | Material Name | % Wt. | % Volume |
|---|---|---|---|
| Polymer | Silylated Polyurethane | 31.50 | 49.88 |
| UV Stabilizer | Decanedioic acid, bis (2,2,6,6-tetramethyl-4-piperidinyl) ester | 0.95 | 1.44 |
| Rheology Modifier | Micronized Amide Wax | 34.52 | 19.27 |
| Filler | Calcium Carbonate | 20.40 | 11.87 |
| Filler | Recycled Glass | 0.63 | 1.20 |
| Filler | Fumed Silica | 1.51 | 0.57 |
| Pigment | Titanium Dioxide | 0.95 | 1.43 |
| Plasticizer | Poly Propylene Glycol | 1.43 | 2.06 |
| Crosslinker | N-Ethyl-3-aminoisobutyl trimethoxysilane; N-Ethylamino isobutyltrimethoxysilane | 7.54 | 11.40 |
| Adhesion Promoter | Gamma-Aminopropyltrimethoxysilane | 0.40 | 0.63 |
| Catalyst | Dioctyltin Dilaurate | 0.17 | 0.25 |

In at least one embodiment of this example, the viscosity of the membrane is between 200 and 220 penetration units and the weight per gallon is between 12.50 and 12.70.

Silicone Polymer Moisture Cured Patching Compound Membrane Example

One or more white patching membrane examples may include a poly dimethyl siloxane (Silicone) moisture cured membrane. This patching compound membrane example includes a Silicone polymer resin binder, a recycled glass filler, a rheology modifier, a calcium carbonate filler, a fumed silica filler, a pigment, a plasticizer, a crosslinker, a moisture control agent, an adhesion promoter, and a catalyst. The Silicone polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known patching compounds that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a moisture control agent, vinyltrimethoxysilane. Other moisture control agents are possible within the scope and spirit of this application. The moisture control agent acts as a safeguard to prevent the membrane from drying before its application to a surface.

The membrane in this example includes a rheology modifier, micronized amide wax. Other rheology modifiers are possible within the scope and spirit of this application. Use of the rheology modifier controls the viscosity of the membrane, such that the membrane remains self-leveling upon application to the surface. The rheology modifier may alter the viscosity of the membrane for one or more desired applications, including exterior adhesives and patches.

Further, the membrane in this example includes an adhesion promoter, N(beta-aminoethyl) gammaaminopropyltrimethoxysilane. Other adhesion promoters are possible within the scope and spirit of this application. The adhesion promoter acts to enhance the adhesion of coatings or adhesives within the membrane.

The membrane in this particular example includes a catalyst, dibutyltin dilaurate. Other catalysts are possible within the scope and spirit of this application. The catalyst reduces the curing and drying time of the membrane.

The membrane in this example also includes a pigment, titanium dioxide. Other pigments or no pigment at all are possible within the scope and spirit of this application. The pigment provides the commercially desired coloration characteristics to the membrane. In one or more embodiments, the color may be white to better reflect UV rays from the membrane.

The membrane in this example includes a plasticizer, poly dimethyl siloxane. Other plasticizers are possible within the scope and spirit of this application. The plasticizer interacts with the polymer resin binder to enhance the plasticity and flexibility of the membrane.

The membrane in this particular example also includes a crosslinker, methyl tris(MEKO) silane. Other cross linkers are possible within the scope and spirit of this application. Use of the crosslinker enhances interactions between the materials of the membrane.

The membrane in this particular example includes a calcium carbonate filler. The calcium carbonate filler may comprise limestone, ground silica, or other functionally equivalent minerals. The calcium carbonate filler increases the absorption of the membrane. The membrane in this example also includes a fumed silica filler, which adds strength and support to the membrane. Other fillers or the use of recycled glass alone as a filler as possible.

An example white patching compound formulation with a Silicone polymer resin includes:

| Material Type | Material Name | Range % by Weight |
| --- | --- | --- |
| Polymer | Poly Dimethyl Siloxane | 30.00-33.00 |
| Crosslinker | Methyl tris(MEKO) Silane | 0.75-1.00 |
| Rheology Modifier | Micronized Amide Wax | 0.75-1.00 |
| Filler | Calcium Carbonate | 33.00-35.00 |
| Filler | Recycled Glass | 20.00-25.00 |
| Filler | Fumed Silica | 1.50-2.00 |
| Pigment | Titanium Dioxide | 1.50-2.00 |
| Plasticizer | Poly Dimethyl Siloxane | 6.00-8.00 |
| Moisture Control | Vinyltrimethoxysilane | 0.50-1.00 |
| Adhesion Promoter | N(beta-aminoethyl) Gammaaminopropyltrimethoxysilane | 1.00-2.00 |
| Catalyst | Dibutyltin Dilaurate | 0.01-0.03 |

An example white patching compound formulation with a Silanol-Terminated Silicone polymer resin includes:

| Material Type | Material Name | % Wt. | % Volume |
| --- | --- | --- | --- |
| Polymer | Poly Dimethyl Siloxane | 31.57 | 49.00 |
| Crosslinker | Methyl tris(MEKO) Silane | 0.95 | 1.48 |
| Rheology Modifier | Micronized Amide Wax | 0.95 | 1.44 |
| Filler | Calcium Carbonate | 34.57 | 19.41 |
| Filler | Recycled Glass | 20.44 | 11.96 |
| Filler | Fumed Silica | 1.58 | 3.00 |
| Pigment | Titanium Dioxide | 1.58 | 0.60 |
| Plasticizer | Poly Dimethyl Siloxane | 6.55 | 10.38 |
| Moisture Control | Vinyltrimethoxysilane | 0.71 | 1.11 |
| Adhesion Promoter | N(beta-aminoethyl) Gammaaminopropyltrimethoxysilane | 1.09 | 1.61 |
| Catalyst | Dibutyltin Dilaurate | 0.01 | 0.01 |

In at least one embodiment of this example, the viscosity of the membrane is between 200 and 220 penetration units and the weight per gallon is between 12.60 and 12.70.

White Caulk/Sealant Compound Composition Examples

One or more white caulk/sealant membrane examples include polymer resin binders, recycled glass fillers, UV absorbers and stabilizers, rheology modifiers, pigments, plasticizers, crosslinkers, moisture control agents, water repellants, adhesion promoters, catalysts, calcium carbonate fillers, precipitated calcium carbonate fillers, and silica fillers. The polymer resin binder may be a Silane-Terminated Poly Ether (STPE) polymer, a Silylated Polyurethane (SPUR) polymer, a Poly Dimethyl Siloxane (Silicone) polymer, a methyldimethoxysilylpropyloxy-terminated polyoxypropylene polymer, or functional equivalents of these polymers. The polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known caulk/sealant compounds that do not contain a polymer resin binder.

As discussed above, the recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The UV absorber may be benzotriazole or functional equivalents of this UV absorber. The absorption of UV rays increases the membrane's durability and impermeability by enhancing the protection of one or more polymer resin binders, including the STPE and methyldimethoxysilylpropyloxy-terminated polyoxypropylene polymers. The UV stabilizer may be decanedioic acid, bis (2,2,6,6-tetramethyl-4-piperidinyl) ester or functional equivalents of this UV stabilizer. Use of the UV stabilizer protects the membrane from long-term degradation. One or more example membranes may have an 84% reflectivity of UV rays due to the use of the recycled glass, UV absorber, and UV stabilizer.

The moisture control agent may be vinyltrimethoxysilane or functional equivalents of this moisture control agent. The moisture control agent acts as a safeguard to prevent the membrane from drying before its application to a surface.

The rheology modifier may be a micronized amide wax or functional equivalents of this rheology modifier. Use of the rheology modifier controls the viscosity of the membrane, such that the membrane remains self-leveling upon application to the surface. The rheology modifier will alter the viscosity of the membrane for one or more desired applications, including sealants, caulks and exterior adhesives.

The adhesion promoter may be N(beta-aminoethyl) gammaaminopropyltrimethoxysilane or Gamma-Aminopropyltrimethoxysilane or functional equivalents of these adhesion promoters. The adhesion promoter acts to enhance the adhesion of coatings or adhesives within the membrane.

The catalyst may be dibutyltin dilaurate, dioctyltin dilaurate, or dibutyltin diacetylacetonate, or functional equivalents of these catalysts. The catalyst reduces the curing and drying time of the membrane.

The pigment may be titanium dioxide or equivalents of this pigment. The pigment provides the commercially desired coloration characteristics to the membrane. In one or more embodiments, the color may be white to better reflect UV rays from the membrane.

The plasticizer may be dinonyl phthalate, poly propylene glycol, poly dimethyl siloxane, or functional equivalents of this plasticizer. The plasticizer interacts with the polymer resin binder to enhance the plasticity and flexibility of the membrane.

The crosslinker may be methyl tris(MEKO) silane or N-ethyl-3-aminoisobutyl trimethoxysilane; N-ethylamino isobutyltrimethoxysilane or functional equivalents of these crosslinkers. Use of the crosslinker enhances interactions between the materials of the membrane.

The water repellant may be monomeric alkylalkoxysilane or functional equivalents of this water repellant. The water repellant serves to enhance the membrane's water repellant properties and maintain an impervious layer.

The calcium carbonate filler and precipitated calcium carbonate filler may both comprise limestone, ground silica, or other functionally equivalent minerals. The calcium carbonate fillers increase the absorption of the membrane. The silica filler may be fumed silica or other functionally equivalent forms of silica. The fumed silica serves to add strength and support to the membrane.

STPE Polymer Moisture Cured Caulk/Sealant Membrane Example

One or more white caulk/sealant membrane examples may include a Silane-Terminated Poly Ether (STPE) moisture cured membrane. This caulk/sealant compound membrane example includes a STPE polymer resin binder, a recycled glass filler, a UV absorber, a UV stabilizer, a rheology modifier, a calcium carbonate filler, a precipitated calcium carbonate filler, a fumed silica filler, a pigment, a plasticizer, a moisture control agent, an adhesion promoter, and a catalyst. The STPE polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known caulks/sealants that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a UV absorber, benzotriazole. Other UV absorbers are possible within the scope and spirit of this application. The absorption of UV rays increases the membrane's durability and impermeability by enhancing the protection of the STPE polymer. The membrane in this example includes a UV stabilizer, decanedioic acid, bis (2,2,6,6-tetramethyl-4-piperidinyl) ester. Other UV stabilizers are possible within the scope and spirit of this application. Use of the UV stabilizer protects the membrane from long-term degradation. One or more examples of the membranes herein may qualify for a Cool Roof Rating Council designation of a "cool" roof, meaning that it is of sufficient solar reflectance and thermal emittance (radiative properties). One or more examples of the membranes may have an 84% reflectivity of UV rays due to the use of the recycled glass, UV absorber and UV stabilizer.

The membrane in this particular example includes a moisture control agent, vinyltrimethoxysilane. Other moisture control agents are possible within the scope and spirit of this application. The moisture control agent acts as a safeguard to prevent the membrane from drying before its application to a surface.

The membrane in this example includes a rheology modifier, micronized amide wax. Other rheology modifiers are possible within the scope and spirit of this application. Use of the rheology modifier controls the viscosity of the membrane, such that the membrane remains self-leveling upon application to the surface. The rheology modifier may alter the viscosity of the membrane for one or more desired applications, including sealants, caulks and exterior adhesives.

Further, the membrane in this example includes an adhesion promoter, N(beta-aminoethyl) gammaaminopropyltrimethoxysilane. Other adhesion promoters are possible within the scope and spirit of this application. The adhesion promoter acts to enhance the adhesion of coatings or adhesives within the membrane.

The membrane in this particular example includes a catalyst, dibutyltin dilaurate. Other catalysts are possible within the scope and spirit of this application. The catalyst reduces the curing and drying time of the membrane.

The membrane in this example also includes a pigment, titanium dioxide. Other pigments or no pigment at all are possible within the scope and spirit of this application. The pigment provides the commercially desired coloration characteristics to the membrane. In one or more embodiments, the color may be white to better reflect UV rays from the membrane.

The membrane in this example includes a plasticizer, dinonyl phthalate. Other plasticizers are possible within the scope and spirit of this application. The plasticizer interacts with the polymer resin binder to enhance the plasticity and flexibility of the membrane.

The membrane in this particular example includes a calcium carbonate filler and a precipitated calcium carbonate filler. The calcium carbonate fillers may comprise limestone, ground silica, or other functionally equivalent minerals. The calcium carbonate fillers increase the absorption of the membrane. The membrane in this example includes a fumed silica filler, which adds strength and support to the membrane. Other fillers or the use of recycled glass alone as a filler are possible.

An example white caulk/sealant compound formulation with an STPE polymer resin includes:

| Material Type | Material Name | Range % by Weight |
|---|---|---|
| Polymer | Silane-Terminated Poly Ether | 30.00-35.00 |
| UV Absorber | Benzotriazole | 0.05-0.10 |
| UV Stabilizer | Decanedioic acid, bis (2,2,6,6-tetramethyl-4-piperidinyl) ester | 0.05-0.10 |
| Rheology Modifier | Micronized Amide Wax | 1.00-2.00 |
| Filler | Calcium Carbonate | 20.00-25.00 |
| Filler | Recycled Glass | 20.00-25.00 |
| Filler | Precipitated Calcium Carbonate | 11.00-13.00 |
| Filler | Fumed Silica | 0.50-1.00 |
| Pigment | Titanium Dioxide | 1.00-3.00 |
| Plasticizer | Dinonyl Pthalate | 4.00-5.00 |
| Moisture Control | Vinyltrimethoxysilane | 1.00-2.00 |
| Adhesion Promoter | N(beta-aminoethyl) Gammaaminopropyltrimethoxysilane | 0.75-1.00 |
| Catalyst | Dibutyltin Dilaurate | 0.01-0.03 |

Another example white caulk/sealant compound formulation with an STPE polymer resin includes:

| Material Type | Material Name | % Wt. | % Volume |
|---|---|---|---|
| Polymer | Silane-Terminated Poly Ether | 34.10 | 53.70 |
| UV Absorber | Benzotriazole | 0.09 | 0.12 |
| UV Stabilizer | Decanedioic acid, bis (2,2,6,6-tetramethyl-4-piperidinyl) ester | 0.09 | 0.14 |
| Rheology Modifier | Micronized Amide Wax | 1.10 | 1.68 |
| Filler | Calcium Carbonate | 21.22 | 11.96 |
| Filler | Recycled Glass | 21.22 | 12.47 |
| Filler | Precipitated Calcium Carbonate | 12.58 | 7.11 |
| Filler | Fumed Silica | 0.63 | 1.20 |
| Pigment | Titanium Dioxide | 1.96 | 0.75 |
| Plasticizer | Dinonyl Pthalate | 4.72 | 7.40 |
| Moisture Control | Vinyltrimethoxysilane | 0.94 | 1.49 |
| Adhesion Promoter | N(beta-aminoethyl) Gammaaminopropyltrimethoxysilane | 1.34 | 1.97 |
| Catalyst | Dibutyltin Dilaurate | 0.01 | 0.01 |

In at least one embodiment of this example, the viscosity of the membrane is substantially between 220 and 230 penetration units and the weight per gallon is substantially between 12.65 and 12.80.

Methyldimethoxysilylpropyloxy-Terminated Polyoxypropylene Moisture Cured Caulk/Sealant Membrane Example One or more white caulk/sealant membrane examples may include a methyldimethoxysilylpropyloxy-terminated polyoxypropylene moisture cured membrane. This caulk/sealant compound membrane example includes a MS methyldimethoxysilylpropyloxy-terminated polyoxypropylene polymer resin binder, a recycled glass filler, a UV absorber, a UV stabilizer, a rheology modifier, a calcium carbonate filler, a fumed silica filler, a pigment, a plasticizer, a moisture control agent, an adhesion promoter, and a catalyst. The methyldimethoxysilylpropyloxy-terminated polyoxypropylene polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known caulk/sealant compounds that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a UV absorber, benzotriazole. Other UV absorbers are possible within the scope and spirit of this application. The absorption of UV rays increases the membrane's durability and impermeability by enhancing the protection of the STPE polymer. The membrane in this example includes a UV stabilizer, decanedioic acid, bis (2,2,6,6-tetramethyl-4-piperidinyl) ester. Other UV stabilizers are possible within the scope and spirit of this application. Use of the UV stabilizer protects the membrane from long-term degradation. One or more examples of the membranes herein may qualify for a Cool Roof Rating Council designation of a "cool" roof, meaning that it is of sufficient solar reflectance and thermal emittance (radiative properties). One or more examples of the membranes may have an 84% reflectivity of UV rays due to the use of the recycled glass, UV absorber and UV stabilizer.

The membrane in this particular example includes a moisture control agent, vinyltrimethoxysilane. Other moisture control agents are possible within the scope and spirit of this application. The moisture control agent acts as a safeguard to prevent the membrane from drying before its application to a surface.

The membrane in this example includes a rheology modifier, micronized amide wax. Other rheology modifiers are possible within the scope and spirit of this application. Use of the rheology modifier controls the viscosity of the membrane, such that the membrane remains self-leveling upon application to the surface. The rheology modifier may alter the viscosity of the membrane for one or more desired applications, including sealants, caulks and exterior adhesives.

Further, the membrane in this example includes an adhesion promoter, N(beta-aminoethyl) gammaaminopropyltrimethoxysilane. Other adhesion promoters are possible within the scope and spirit of this application. The adhesion promoter acts to enhance the adhesion of coatings or adhesives within the membrane.

The membrane in this particular example includes a catalyst, dibutyltin diacetylacetonate. Other catalysts are possible within the scope and spirit of this application. The catalyst reduces the curing and drying time of the membrane.

The membrane in this example also includes a pigment, titanium dioxide. The pigment provides the commercially desired coloration characteristics to the membrane. In one or more embodiments, the color may be white to better reflect UV rays from the membrane. Other pigments, or no pigment at all, are possible within the scope and spirit of this application.

The membrane in this example includes a plasticizer, dinonyl phthalate. Other plasticizers are possible within the scope and spirit of this application. The plasticizer interacts with the polymer resin binder to enhance the plasticity and flexibility of the membrane.

The membrane in this particular example includes a calcium carbonate filler. The calcium carbonate filler may comprise limestone, ground silica, or other functionally equivalent minerals. The calcium carbonate filler increases the absorption of the membrane. Additionally, the membrane in this example includes a fumed silica filler, which adds strength and support to the membrane. Other fillers or the use of recycled glass alone as a filler are possible within the scope and spirit of this application.

An example white caulk/sealant compound formulation with a MS methyldimethoxysilylpropyloxy-terminated polyoxypropylene polymer resin includes:

| Material Type | Material Name | Range % by Weight |
| --- | --- | --- |
| Polymer | Methyldimethoxysilylpropyloxy-terminated polyoxypropylene | 30.00-35.00 |
| UV Absorber | Benzotriazole | 0.10-0.20 |
| UV Stabilizer | Decanedioic acid, bis (2,2,6,6-tetramethyl-4-piperidinyl) ester | 0.10-0.20 |
| Rheology Modifier | Micronized Amide Wax | 0.50-1.00 |
| Filler | Calcium Carbonate | 20.00-25.00 |
| Filler | Recycled Glass | 20.00-24.00 |
| Filler | Fumed Silica | 0.75-1.00 |
| Pigment | Titanium Dioxide | 6.00-8.00 |
| Plasticizer | Dinonyl Pthalate | 8.50-9.00 |
| Moisture Control | Vinyltrimethoxysilane | 1.00-2.00 |
| Adhesion Promoter | N(beta-aminoethyl) Gammaaminopropyltrimethoxysilane | 1.50-2.50 |
| Catalyst | Dibutyltin Diacetylacetonate | 0.15-0.30 |

Another example white caulk/sealant compound formulation with a methyldimethoxysilylpropyloxy-terminated polyoxypropylene polymer resin includes:

| Material Type | Material Name | % Wt. | % Volume |
| --- | --- | --- | --- |
| Polymer | Methyldimethoxysilylpropyloxy-terminated polyoxypropylene | 34.04 | 50.80 |
| UV Absorber | Benzotriazole | 0.14 | 0.18 |
| UV Stabilizer | Decanedioic acid, bis (2,2,6,6-tetramethyl-4-piperidinyl) ester | 0.14 | 0.21 |
| Rheology Modifier | Micronized Amide Wax | 0.81 | 1.20 |
| Filler | Calcium Carbonate | 23.16 | 12.63 |
| Filler | Recycled Glass | 22.02 | 12.51 |
| Filler | Fumed Silica | 0.89 | 1.65 |
| Pigment | Titanium Dioxide | 6.50 | 2.40 |
| Plasticizer | Dinonyl Pthalate | 8.94 | 13.56 |
| Moisture Control | Vinyltrimethoxysilane | 1.14 | 1.73 |
| Adhesion Promoter | N(beta-aminoethyl) Gammaaminopropyltrimethoxysilane | 1.95 | 2.80 |
| Catalyst | Dibutyltin Diacetylacetonate | 0.27 | 0.33 |

In at least one embodiment of this example, the viscosity of the membrane is between 220 and 230 penetration units and the weight per gallon is between 12.20 and 12.50.

SPUR Polymer Moisture Cured Caulk/Sealant Membrane Example

One or more white caulk/sealant membrane examples may include a Silylated Polyurethane (SPUR) moisture cured membrane. This caulk/sealant compound membrane example includes a polymer resin binder, a recycled glass filler, a UV stabilizer, a rheology modifier, a calcium carbonate filler, a fumed silica filler, a pigment, a plasticizer, a crosslinker, an adhesion promoter, a water repellant, and a catalyst. The SPUR polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known caulk/sealant compounds that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a UV stabilizer, decanedioic acid, bis (2,2,6,6-tetramethyl-4-piperidinyl) ester. Other UV absorbers are possible within the scope and spirit of this application. Use of the UV stabilizer protects the membrane from long-term degradation. One or more examples of the membranes herein may qualify for a Cool Roof Rating Council designation of a "cool" roof, meaning that it is of sufficient solar reflectance and thermal emittance (radiative properties).

The membrane in this example includes a rheology modifier, micronized amide wax. Other rheology modifiers are possible within the scope and spirit of this application. Use of the rheology modifier controls the viscosity of the membrane, such that the membrane remains self-leveling upon application to the surface. The rheology modifier may alter the viscosity of the membrane for one or more desired applications, including sealants, caulks and exterior adhesives.

Further, the membrane in this example includes an adhesion promoter, wherein the adhesion promoter is gamma-aminopropyltrimethoxysilane. The adhesion promoter acts to enhance the adhesion of coatings or adhesives within the membrane.

The membrane in this particular example includes a catalyst, wherein the catalyst is dioctyltin dilaurate. The catalyst reduces the curing and drying time of the membrane.

The membrane in this example also includes a pigment, wherein the pigment is titanium dioxide. The pigment provides the commercially desired coloration characteristics to the membrane. In one or more embodiments, the color may be white to better reflect UV rays from the membrane.

The membrane in this example includes a plasticizer, wherein the plasticizer is poly propylene glycol. The plasticizer interacts with the polymer resin binder to enhance the plasticity and flexibility of the membrane.

The membrane in this example also includes a crosslinker, wherein the crosslinker is N-ethyl-3-aminoisobutyl trimethoxysilane; N-ethylamino isobutyltrimethoxysilane. Use of the crosslinker enhances interactions between the materials of the membrane.

The membrane is this example includes a water repellant, wherein the water repellant is Monomeric Alkylalkoxysilane. The water repellant serves to enhance the membrane's water repellant properties and maintain an impervious layer.

The membrane in this particular example includes a calcium carbonate filler. The calcium carbonate filler may comprise limestone, ground silica, or other functionally equivalent minerals. The calcium carbonate filler increases the absorption of the membrane. The membrane in this example also includes a fumed silica filler, which adds strength and stability to the membrane.

An example white caulk/sealant compound formulation with a SPUR polymer resin includes:

| Material Type | Material Name | Range % by Weight |
| --- | --- | --- |
| Polymer | Silylated Polyurethane | 34.00-38.00 |
| UV Stabilizer | Decanedioic acid, bis (2,2,6,6-tetramethyl-4-piperidinyl) ester | 0.75-1.00 |
| Rheology Modifier | Micronized Amide Wax | 1.00-2.00 |
| Filler | Calcium Carbonate | 24.00-27.00 |
| Filler | Recycled Glass | 24.00-27.00 |
| Filler | Fumed Silica | 0.50-0.75 |
| Pigment | Titanium Dioxide | 1.50-2.00 |
| Plasticizer | Poly Propylene Glycol | 3.00-5.00 |
| Crosslinker | N-Ethyl-3-aminoisobutyl trimethoxysilane;N-Ethylamino isobutyltrimethoxysilane | 1.00-3.00 |
| Adhesion Promoter | Gamma-Aminopropyltrimethoxysilane | 0.25-0.50 |
| Catalyst | Dioctyltin Dilaurate | 0.15-0.30 |
| Water Repellant | Monomeric Alkylalkoxysilane | 3.00-5.00 |

Another example white caulk/sealant compound formulation with a SPUR polymer resin includes:

| Material Type | Material Name | % Wt. | % Volume |
| --- | --- | --- | --- |
| Polymer | Silylated Polyurethane | 36.43 | 55.29 |
| UV Stabilizer | Decanedioic acid, bis (2,2,6,6-tetramethyl-4-piperidinyl) ester | 1.24 | 1.80 |
| Rheology Modifier | Micronized Amide Wax | 25.34 | 13.55 |
| Filler | Calcium Carbonate | 25.34 | 14.13 |
| Filler | Recycled Glass | 0.58 | 0.42 |
| Filler | Fumed Silica | 1.66 | 0.60 |
| Pigment | Titanium Dioxide | 0.83 | 1.19 |
| Plasticizer | Poly Propylene Glycol | 1.49 | 2.06 |
| Crosslinker | N-Ethyl-3-aminoisobutyl trimethoxysilane; N-Ethylamino isobutyltrimethoxysilane | 3.31 | 4.80 |
| Adhesion Promoter | Gamma-Aminopropyltrimethoxysilane | 0.41 | 0.63 |
| Catalyst | Dioctyltin Dilaurate | 3.15 | 5.21 |
| Water Repellant | Monomeric Alkylalkoxysilane | 0.22 | 0.32 |

In at least one embodiment of this example, the viscosity of the membrane is between 220 and 230 penetration units and the weight per gallon is between 12.00 and 12.20.

Silicone Polymer Moisture Cured Caulk/Sealant Membrane Example

One or more white caulk/sealant membrane examples may include a poly dimethyl siloxane (Silicone) moisture cured membrane. This caulk/sealant compound membrane example includes a polymer resin binder, a recycled glass filler, a rheology modifier, a calcium carbonate filler, a fumed silica filler, a pigment, a plasticizer, a crosslinker, a moisture control agent, an adhesion promoter, and a catalyst. The polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known caulk/sealant compounds that do not contain a polymer resin binder.

The recycled glass filler may be a recycled glass having a particle size substantially between 3 and 20 microns. The particle size achieved by use of the recycled glass enhances the interaction of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a moisture control agent, vinyltrimethoxysilane. Other moisture control agents are possible within the scope and spirit of this application. The moisture control agent acts as a safeguard to prevent the membrane from drying before its application to a surface.

The membrane in this example includes a rheology modifier, wherein the rheology modifier is micronized amide wax. Use of the rheology modifier controls the viscosity of the membrane, such that the membrane remains self-leveling upon application to the surface. The rheology modifier may alter the viscosity of the membrane for one or more desired applications, including sealants, caulks and exterior adhesives.

Further, the membrane in this example includes an adhesion promoter, N(beta-aminoethyl) gammaaminopropyltrimethoxysilane. Other adhesion promoters are possible within the scope and spirit of this application. The adhesion promoter acts to enhance the adhesion of coatings or adhesives within the membrane.

The membrane in this particular example includes a catalyst, dibutyltin dilaurate. Other catalysts are possible within the scope and spirit of this application. The catalyst reduces the curing and drying time of the membrane.

The membrane in this example also includes a pigment, titanium dioxide. Other pigments or no pigment at all are possible within the scope and spirit of this application. The pigment provides the commercially desired coloration characteristics to the membrane. In one or more embodiments, the color may be white to better reflect UV rays from the membrane.

The membrane in this example includes a plasticizer, poly dimethyl siloxane. Other plasticizers are possible within the scope and spirit of this application. The plasticizer interacts with the polymer resin binder to enhance the plasticity and flexibility of the membrane.

The membrane in this particular example also includes a crosslinker, methyl tris(MEKO) silane. Other crosslinkers are possible within the scope and spirit of this application. Use of the crosslinker enhances interactions between the materials of the membrane.

The membrane in this particular example includes a calcium carbonate filler. The calcium carbonate filler may comprise limestone, ground silica, or other functionally equivalent minerals. The calcium carbonate filler increases the absorption of the membrane. The membrane in this example also includes a fumed silica filler, which adds strength and support to the membrane. Other fillers or the use of recycled glass alone as a filler are possible in other examples.

An example white caulk/sealant compound formulation with a Silicone polymer resin includes:

| Material Type | Material Name | Range % by Weight |
| --- | --- | --- |
| Polymer | Poly Dimethyl Siloxane | 30.00-33.00 |
| Crosslinker | Methyl tris(MEKO) Silane | 1.00-2.00 |
| Rheology Modifier | Micronized Amide Wax | 1.00-2.00 |
| Filler | Calcium Carbonate | 30.00-33.00 |
| Filler | Recycled Glass | 20.00-23.00 |
| Filler | Fumed Silica | 0.80-1.00 |
| Pigment | Titanium Dioxide | 2.00-3.00 |
| Plasticizer | Poly Dimethyl Siloxane | 8.00-10.00 |
| Moisture Control | Vinyltrimethoxysilane | 0.75-1.00 |
| Adhesion Promoter | N(beta-aminoethyl) Gammaaminopropyltrimethoxysilane | 0.80-1.00 |
| Catalyst | Dibutyltin Dilaurate | 0.01-0.03 |

An example white caulk/sealant compound formulation with a Silanol-Terminated Silicone polymer resin includes:

| Material Type | Material Name | % Wt. | % Volume |
| --- | --- | --- | --- |
| Polymer | Poly Dimethyl Siloxane | 31.14 | 47.90 |
| Crosslinker | Methyl tris(MEKO) Silane | 1.20 | 1.85 |
| Rheology Modifier | Micronized Amide Wax | 1.12 | 1.68 |
| Filler | Calcium Carbonate | 31.86 | 17.72 |
| Filler | Recycled Glass | 20.71 | 12.00 |
| Filler | Fumed Silica | 0.96 | 1.80 |
| Pigment | Titanium Dioxide | 2.71 | 1.02 |
| Plasticizer | Poly Dimethyl Siloxane | 8.53 | 13.38 |
| Moisture Control | Vinyltrimethoxysilane | 0.80 | 1.24 |
| Adhesion Promoter | N(beta-aminoethyl) Gammaaminopropyltrimethoxysilane | 0.96 | 1.40 |
| Catalyst | Dibutyltin Dilaurate | 0.01 | 0.01 |

In at least one embodiment of this example, the viscosity of the membrane is between 220 and 230 penetration units and the weight per gallon is between 12.40 and 12.60.

Elastomeric Roof Coating Compound Composition Examples

One or more roof coating membrane examples include polymer resin binders, recycled glass fillers, UV absorbers and stabilizers, rheology modifiers, pigments, plasticizers, crosslinkers, moisture control agents, adhesion promoters, catalysts, calcium carbonate fillers, Barium Sulfate fillers, and silica fillers. The polymer resin binder may be a Silane-Terminated Poly Ether (STPE) polymer, a Silylated Polyurethane (SPUR) polymer, a Poly Dimethyl Siloxane (Silicone) polymer, a methyldimethoxysilylpropyloxy-terminated polyoxypropylene polymer, or functional equivalents of these polymers. The polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known roof coatings that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The UV absorber may be benzotriazole or functional equivalents of this UV absorber. The absorption of UV rays increases the membrane's durability and impermeability by enhancing the protection of one or more polymer resin binders, including the STPE and methyldimethoxysilylpropyloxy-terminated polyoxypropylene polymers. The UV stabilizer may be decanedioic acid, bis (2,2,6,6-tetramethyl-4-piperidinyl) ester or functional equivalents of this UV stabilizer. Use of the UV stabilizer protects the membrane from long-term degradation. One or more examples of the membranes may have an 84% reflectivity of UV rays due to the use of the recycled glass, UV absorber, and UV stabilizer.

The moisture control agent may be vinyltrimethoxysilane or functional equivalents of this moisture control agent. The moisture control agent acts as a safeguard to prevent the membrane from drying before its application to a surface.

The rheology modifier may be a micronized amide wax or functional equivalents of this rheology modifier. Use of the rheology modifier controls the viscosity of the membrane, such that the membrane remains self-leveling upon application to the surface. The rheology modifier will alter the viscosity of the membrane for one or more desired applications, including roof coatings.

The adhesion promoter may be N(beta-aminoethyl) gammaaminopropyltrimethoxysilane or Gamma-Aminopropyltrimethoxysilane or functional equivalents of these adhesion promoters. The adhesion promoter acts to enhance the adhesion of coatings or adhesives within the membrane.

The catalyst may be dibutyltin dilaurate, dioctyltin dilaurate, or dibutyltin diacetylacetonate, or functional equivalents of these catalysts. The catalyst reduces the curing and drying time of the membrane.

One or more roof coating examples may be white roof coatings. The pigment in white roof coating examples may be titanium dioxide or equivalents of this pigment. The pigment provides the commercially desired coloration characteristics to the membrane. In one or more embodiments, the color may be white to better reflect UV rays from the membrane.

The plasticizer may be dinonyl phthalate, poly propylene glycol, poly dimethyl siloxane, or functional equivalents of this plasticizer. The plasticizer interacts with the polymer resin binder to enhance the plasticity and flexibility of the membrane.

The crosslinker may be methyl tris(MEKO) silane or N-ethyl-3-aminoisobutyl trimethoxysilane; N-ethylamino isobutyltrimethoxysilane or functional equivalents of these crosslinkers. Use of the crosslinker enhances interactions between the materials of the membrane.

The calcium carbonate filler may comprise limestone, ground silica, or other functionally equivalent minerals. The calcium carbonate filler increase the absorption of the membrane. The silica filler may be fumed silica or other functionally equivalent forms of silica. The fumed silica serves to add strength and support to the membrane. The barium sulfate filler increases acid and alkali resistance in the membrane.

STPE Polymer Moisture Cured Roof Coating Membrane Example

One or more white roof coating membrane examples may include a Silane-Terminated Poly Ether (STPE) moisture cured membrane. This roof coating compound membrane example includes a polymer resin binder, a recycled glass filler, a UV absorber, a UV stabilizer, a rheology modifier, a calcium carbonate filler, a pigment, a plasticizer, a moisture control agent, an adhesion promoter, and a catalyst. The polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known roof coatings that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a UV absorber, benzotriazole. Other UV absorbers are possible within the scope and spirit of this application. The absorption of UV rays increases the membrane's durability and impermeability by enhancing the protection of the STPE polymer. The membrane in this example includes a UV stabilizer, wherein the UV stabilizer is decanedioic acid, bis (2,2,6,6-tetramethyl-4-piperidinyl) ester. Use of the UV stabilizer protects the membrane from long-term degradation. One or more examples of the membranes herein may qualify for a Cool Roof Rating Council designation of a "cool" roof, meaning that it is of sufficient solar reflectance and thermal emittance (radiative properties). One or more example membranes may have an 84% reflectivity of UV rays due to the use of the recycled glass, UV absorber and UV stabilizer.

The membrane in this particular example includes a moisture control agent, vinyltrimethoxysilane. Other moisture control agents are possible within the scope and spirit of this application. The moisture control agent acts as a safeguard to prevent the membrane from drying before its application to a surface.

The membrane in this example includes a rheology modifier, micronized amide wax. Other rheology modifiers are possible within the scope and spirit of this application. Use of the rheology modifier controls the viscosity of the membrane, such that the membrane remains self-leveling upon application to the surface. The rheology modifier may alter the viscosity of the membrane for one or more desired applications, including roof coatings.

Further, the membrane in this example includes an adhesion promoter, N(beta-aminoethyl) gammaaminopropyltrimethoxysilane. Other adhesion promoters are possible within the scope and spirit of this application. The adhesion promoter acts to enhance the adhesion of coatings or adhesives within the membrane.

The membrane in this particular example includes a catalyst, dibutyltin dilaurate. Other catalysts are possible within the scope and spirit of this application. The catalyst reduces the curing and drying time of the membrane.

The membrane in this example also includes a pigment, titanium dioxide. Other pigments or no pigment at all are possible in other examples. The pigment provides the commercially desired coloration characteristics to the membrane. In one or more embodiments, the color may be white to better reflect UV rays from the membrane.

The membrane in this example includes a plasticizer, dinonyl phthalate. Other plasticizers are possible within the scope and spirit of this application. The plasticizer interacts with the polymer resin binder to enhance the plasticity and flexibility of the membrane.

The membrane in this particular example includes a calcium carbonate filler. The calcium carbonate filler may comprise limestone, ground silica, or other functionally equivalent minerals. The calcium carbonate filler increases the absorption of the membrane. Other fillers or the use of recycled glass alone as a filler are possible in other examples.

An example white roof coating compound formulation with an STPE polymer resin includes:

| Material Type | Material Name | Range % by Weight |
|---|---|---|
| Polymer | Silane-Terminated Poly Ether | 35.00-40.00 |
| UV Absorber | Benzotriazole | 0.05-0.10 |
| UV Stabilizer | Decanedioic acid, bis (2,2,6,6-tetramethyl-4-piperidinyl) ester | 0.05-0.10 |
| Rheology Modifier | Micronized Amide Wax | 0.50-0.75 |
| Filler | Calcium Carbonate | 25.00-30.00 |
| Filler | Recycled Glass | 20.00-25.00 |
| Pigment | Titanium Dioxide | 8.00-10.00 |
| Plasticizer | Dinonyl Pthalate | 2.00-3.00 |
| Moisture Control | Vinyltrimethoxysilane | 0.75-1.00 |
| Adhesion Promoter | N(beta-aminoethyl) Gammaaminopropyltrimethoxysilane | 0.75-1.00 |
| Catalyst | Dibutyltin Dilaurate | 0.01-0.05 |

Another STPE roof coating example is:

| Material Type | Material Name | % Wt. | % Volume |
|---|---|---|---|
| Polymer | Silane-Terminated Poly Ether | 36.58 | 59.53 |
| UV Absorber | Benzotriazole | 0.07 | 0.10 |
| UV Stabilizer | Decanedioic acid, bis (2,2,6,6-tetramethyl-4-piperidinyl) ester | 0.07 | 0.11 |
| Rheology Modifier | Micronized Amide Wax | 0.53 | 0.84 |
| Filler | Calcium Carbonate | 28.83 | 16.79 |
| Filler | Recycled Glass | 20.53 | 12.47 |
| Pigment | Titanium Dioxide | 9.35 | 3.69 |
| Plasticizer | Dinonyl Pthalate | 2.28 | 3.70 |
| Moisture Control | Vinyltrimethoxysilane | 0.91 | 1.49 |
| Adhesion Promoter | N(beta-aminoethyl) Gammaaminopropyltrimethoxysilane | 0.84 | 1.27 |
| Catalyst | Dibutyltin Dilaurate | 0.01 | 0.01 |

In at least one embodiment of this example, the viscosity of the membrane is substantially between 6000 and 7000 penetration units and the weight per gallon is substantially between 13.10 and 13.30.

Methyldimethoxysilylpropyloxy-Terminated Polyoxypropylene Moisture Cured Roof Coating Membrane Example One or more white roof coating membrane examples may include a methyldimethoxysilylpropyloxy-terminated polyoxypropylene moisture cured membrane. This roof coating compound membrane example includes two methyldimethoxysilylpropyloxy-terminated polyoxypropylene polymer resin binders, a recycled glass filler, a UV absorber, a UV stabilizer, a calcium carbonate filler, a fumed silica filler, a pigment, a plasticizer, a moisture control agent, an adhesion promoter, and a catalyst. The methyldimethoxysilylpropyloxy-terminated polyoxypropylene polymer resin binder acts to bind the membrane components and as a catalyst within the system that absorbs moisture to harden the membrane into a solid, curing it without evaporation of water or volatile organic compounds and without requiring heat application. As a result, the membrane is more durable than previously known roof coatings that do not contain a polymer resin binder.

Two types of methyldimethoxysilylpropyloxy-terminated polyoxypropylene polymers are used to better absorb moisture from the air and use the moisture to more rapidly cure and harden the resin system. The difference between the two types of methyldimethoxysilylpropyloxy-terminated polyoxypropylene polymer is in their viscosities. One methyldimethoxysilylpropyloxy-terminated polyoxypropylene polymer may function as an elastic adhesive (type 1) and the other may function as a reactive diluent (type 2). For example, a methyldimethoxysilylpropyloxy-terminated polyoxypropylene polymer of type 2 having a viscosity of substantially 0.7 (penetration units×103 at 73° F.) and a second methyldimethoxysilylpropyloxy-terminated polyoxypropylene polymer of type 1 having a viscosity of substantially 6.5 (penetration units×103 at 73° F.) may both be used. Of course, other types of methyldimethoxysilylpropyloxy-terminated polyoxypropylene polymers may be used alone or in various combinations in this or other examples.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a UV absorber, benzotriazole. Other UV absorbers are possible within the scope and spirit of this application. The absorption of UV rays increases the membrane's durability and impermeability by enhancing the protection of the STPE polymer. The membrane in this example includes a UV stabilizer, decanedioic acid, bis (2,2,6,6-tetramethyl-4-piperidinyl) ester. Other UV stabilizers are possible within the scope and spirit of this application. Use of the UV stabilizer protects the membrane from long-term degradation. One or more examples of the membranes herein may qualify for a Cool Roof Rating Council designation of a "cool" roof, meaning that it is of sufficient solar reflectance and thermal emittance (radiative properties). One or more examples of the membranes may have an 84% reflectivity of UV rays due to the use of the recycled glass, UV absorber and UV stabilizer.

The membrane in this particular example includes a moisture control agent, vinyltrimethoxysilane. Other moisture control agents are possible within the scope and spirit of this application. The moisture control agent acts as a safeguard to prevent the membrane from drying before its application to a surface.

Further, the membrane in this example includes an adhesion promoter, N(beta-aminoethyl) gammaaminopropyltrimethoxysilane. Other adhesion promoters are possible within the scope and spirit of this application. The adhesion promoter acts to enhance the adhesion of coatings or adhesives within the membrane.

The membrane in this particular example includes a catalyst, dibutyltin diacetylacetonate. Other catalysts are possible within the scope and spirit of this application. The catalyst reduces the curing and drying time of the membrane.

The membrane in this example also includes a pigment, titanium dioxide. The pigment provides the commercially desired coloration characteristics to the membrane. In one or more embodiments, the color may be white to better reflect UV rays from the membrane. In other examples, other pigments or no pigment may be used.

The membrane in this example includes a plasticizer, dinonyl phthalate. Other plasticizers are possible within the scope and spirit of this application. The plasticizer interacts with the polymer resin binder to enhance the plasticity and flexibility of the membrane.

The membrane in this particular example includes a calcium carbonate filler. The calcium carbonate filler may comprise limestone, ground silica, or other functionally equivalent minerals. The calcium carbonate filler increases the absorption of the membrane. Additionally, the membrane in this example includes a fumed silica filler, which adds strength and support to the membrane. Other filler or the use of recycled glass alone as a filler may be possible in other examples.

An example white roof coating compound formulation with two methyldimethoxysilylpropyloxy-terminated polyoxypropylene polymer resins includes:

| Material Type | Material Name | Range % by Weight |
| --- | --- | --- |
| Polymer | Methyldimethoxysilylpropyloxy-terminated polyoxypropylene Type 1 | 26.00-30.00 |
| UV Absorber | Benzotriazole | 0.10-0.20 |
| UV Stabilizer | Decanedioic acid, bis (2,2,6,6-tetramethyl-4-piperidinyl) ester | 0.10-0.20 |
| Filler | Calcium Carbonate | 18.00-20.00 |
| Filler | Recycled Glass | 20.00-24.00 |
| Filler | Fumed Silica | 0.02-0.05 |
| Pigment | Titanium Dioxide | 6.00-7.00 |
| Plasticizer | Dinonyl Pthalate | 10.00-12.00 |
| Moisture Control | Vinyltrimethoxysilane | 1.00-5.00 |
| Adhesion Promoter | N(beta-aminoethyl) Gammaaminopropyltrimethoxysilane | 1.00-1.50 |
| Catalyst | Dibutyltin Diacetylacetonate | 0.20-0.30 |
| Polymer | Methyldimethoxysilylpropyloxy-terminated polyoxypropylene Type 2 | 10.00-12.00 |

Another example white roof coating compound formulation with two MS methyldimethoxysilylpropyloxy-terminated polyoxypropylene polymer resins includes:

| Material Type | Material Name | % Wt. | % Volume |
| --- | --- | --- | --- |
| Polymer | Methyldimethoxysilylpropyloxy-terminated polyoxypropylene Type 1 | 28.44 | 40.38 |
| UV Absorber | Benzotriazole | 0.13 | 0.15 |
| UV Stabilizer | Decanedioic acid, bis (2,2,6,6-tetramethyl-4-piperidinyl) ester | 0.13 | 0.18 |
| Filler | Calcium Carbonate | 19.30 | 10.00 |
| Filler | Recycled Glass | 20.41 | 11.03 |
| Filler | Fumed Silica | 0.04 | 0.08 |
| Pigment | Titanium Dioxide | 6.15 | 2.16 |
| Plasticizer | Dinonyl Pthalate | 11.53 | 16.64 |
| Moisture Control | Vinyltrimethoxysilane | 1.32 | 1.92 |
| Adhesion Promoter | N(beta-aminoethyl) Gammaaminopropyltrimethoxysilane | 1.32 | 1.81 |
| Catalyst | Dibutyltin Diacetylacetonate | 0.30 | 0.35 |
| Polymer | Methyldimethoxysilylpropyloxy-terminated polyoxypropylene Type 2 | 10.93 | 15.30 |

In at least one embodiment of this example, the viscosity of the membrane is between 7000 and 9000 penetration units and the weight per gallon is between 11.80 and 12.00.

SPUR Polymer Moisture Cured Roof Coating Membrane Example

One or more white roof coating membrane examples may include a Silylated Polyurethane (SPUR) moisture cured membrane. This roof coating compound membrane example includes a polymer resin binder, a recycled glass filler, a UV stabilizer, a calcium carbonate filler, a fumed silica filler, a barium sulfate filler, a pigment, a plasticizer, a crosslinker, an adhesion promoter, and a catalyst. The polymer resin binders act to bind the membrane components and as a catalyst within the system that absorbs moisture to harden the membrane into a solid, curing it without evaporation of water or volatile organic compounds and without requiring heat application. As a result, the membrane is more durable than previously known roof coatings that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a UV stabilizer, decanedioic acid, bis (2,2,6,6-tetramethyl-4-piperidinyl) ester. Other UV stabilizers are possible within the scope and spirit of this application. Use of the UV stabilizer protects the membrane from long-term degradation. One or more examples of the membranes herein may qualify for a Cool Roof Rating Council designation of a "cool" roof, meaning that it is of sufficient solar reflectance and thermal emittance (radiative properties).

Further, the membrane in this example includes an adhesion promoter, gamma-aminopropyltrimethoxysilane. Other adhesion promoters are possible. The adhesion promoter acts to enhance the adhesion of coatings or adhesives within the membrane.

The membrane in this particular example includes a catalyst, dioctyltin dilaurate. Other catalysts are possible. The catalyst reduces the curing and drying time of the membrane.

The membrane in this example also includes a pigment, titanium dioxide. The pigment provides the commercially desired coloration characteristics to the membrane. In one or more embodiments, the color may be white to better reflect UV rays from the membrane. Other pigments or no pigment are possible in further examples.

The membrane in this example includes a plasticizer, poly propylene glycol. Other plasticizers are possible in further examples. The plasticizer interacts with the polymer resin binder to enhance the plasticity and flexibility of the membrane.

The membrane in this example also includes a crosslinker, N-ethyl-3-aminoisobutyl trimethoxysilane; N-ethylamino isobutyltrimethoxysilane. Other crosslinkers are possible within the scope and spirit of this application. Use of the crosslinker enhances interactions between the materials of the membrane.

The membrane in this particular example includes a calcium carbonate filler. The calcium carbonate filler may comprise limestone, ground silica, or other functionally equivalent minerals. The calcium carbonate filler increases the absorption of the membrane. The membrane in this example includes a barium sulfate filler, which increases acid and alkali resistance in the membrane. The membrane in this example also includes a fumed silica filler, which adds strength and stability to the membrane. Other fillers or the use of recycled glass alone as a filler are possible in various examples.

An example roof coating compound formulation with a SPUR polymer resin includes:

| Material Type | Material Name | Range % by Weight |
|---|---|---|
| Polymer | Silylated Polyurethane | 40.00-45.00 |
| UV Stabilizer | Decanedioic acid, bis (2,2,6,6-tetramethyl-4-piperidinyl) ester | 0.50-0.75 |
| Filler | CalciumCarbonate | 20.00-22.00 |
| Filler | Recycled Glass | 20.00-22.00 |
| Filler | Fumed Silica | 0.50-0.75 |
| Pigment | Titanium Dioxide | 6.00-8.00 |
| Plasticizer | Poly Propylene Glycol | 4.00-5.00 |
| Crosslinker | N-Ethyl-3-aminoisobutyl trimethoxysilane; N-Ethylamino isobutyltrimethoxysilane | 1.00-2.00 |
| Adhesion Promoter | Gamma-Aminopropyltrimethoxysilane | 0.50-0.75 |
| Catalyst | Dioctyltin Dilaurate | 0.10-0.20 |
| Filler | Barium Sulfate | 2.00-3.00 |

Another example roof coating compound formulation with a SPUR polymer resin includes:

| Material Type | Material Name | % Wt. | % Volume |
|---|---|---|---|
| Polymer | Silylated Polyurethane | 42.00 | 63.45 |
| UV Stabilizer | Decanedioic acid, bis (2,2,6,6-tetramethyl-4-piperidinyl) ester | 2.58 | 0.85 |
| Filler | Calcium Carbonate | 20.80 | 11.08 |
| Filler | Recycled Glass | 20.80 | 11.54 |
| Filler | Fumed Silica | 0.67 | 1.20 |
| Pigment | Titanium Dioxide | 6.49 | 2.34 |
| Plasticizer | Poly Propylene Glycol | 0.50 | 0.71 |
| Crosslinker | N-Ethyl-3-aminoisobutyl trimethoxysilane; N-Ethylamino isobutyltrimethoxysilane | 1.33 | 1.83 |
| Adhesion Promoter | Gamma-Aminopropyltrimethoxysilane | 4.16 | 6.00 |
| Catalyst | Dioctyltin Dilaurate | 0.50 | 0.76 |
| Filler | Barium Sulfate | 0.17 | 0.24 |

In at least one embodiment of this example, the viscosity of the membrane is between 6000 and 7000 penetration units and the weight per gallon is between 12.00 and 12.20.

Silicone Polymer Moisture Cured Roofing Coating Membrane Example

One or more roof coating membrane examples may include a poly dimethyl siloxane (Silicone) moisture cured membrane. This roof coating compound membrane example includes two polymer resin binders, a recycled glass filler, a calcium carbonate filler, a fumed silica filler, a pigment, a plasticizer, a crosslinker, a moisture control agent, an adhesion promoter, and a catalyst. The polymer resin binders act to bind the membrane components and as a catalyst within the system that absorbs moisture to harden the membrane into a solid, curing it without evaporation of water or volatile organic compounds and without requiring heat application. As a result, the membrane is more durable than previously known roof coatings that do not contain a polymer resin binder.

The recycled glass filler may be a recycled glass having a particle size substantially between 3 and 20 microns. The particle size achieved by use of the recycled glass enhances the cohesiveness of the silica to the polymer resin binder to make the cohesiveness more uniform. By the particle size, the recycled glass enhances the durability of the membrane over that achieved by using only other forms of silica, such as fumed or precipitated silica, due to gains achieved in tensile strength. Use of this recycled glass increases moisture resistance for the membrane and UV light repellency to the coating as compared with non-recycled glass (regular silica). Use of the recycled glass also increases fire resistance, solar reflectivity, moisture resistance, and provides the membrane with insulating properties. Use of the recycled glass may make the membrane more energy efficient. One or more examples of the membranes herein may include at least 20% recycled glass materials, so as to qualify for LEED 2 credits for use of recycled materials.

The membrane, in this particular example, also includes a moisture control agent, vinyltrimethoxysilane. Other moisture control agents are possible within the scope and spirit of this application. The moisture control agent acts as a safeguard to prevent the membrane from drying before its application to a surface.

Further, the membrane in this example includes an adhesion promoter, N(beta-aminoethyl) gammaaminopropyltrimethoxysilane. The adhesion promoter acts to enhance the adhesion of coatings or adhesives within the membrane. Other adhesion promoters are possible.

The membrane in this particular example includes a catalyst, dibutyltin dilaurate. Other catalysts are possible within the scope and spirit of this application. The catalyst reduces the curing and drying time of the membrane.

The membrane in this example also includes a pigment, wherein the pigment is titanium dioxide. The pigment provides the commercially desired coloration characteristics to the membrane. In one or more embodiments, the color may be white to better reflect UV rays from the membrane. Other pigments or no pigment is possible in various examples.

The membrane in this example includes a plasticizer, poly dimethyl siloxane. Other plasticizers are possible within the scope and spirit of this application. The plasticizer interacts with the polymer resin binder to enhance the plasticity and flexibility of the membrane.

The membrane in this particular example also includes a crosslinker, methyl tris(MEKO) silane. Other crosslinkers are possible within the scope and spirit of this application. Use of the crosslinker enhances interactions between the materials of the membrane.

The membrane in this particular example includes a calcium carbonate filler. The calcium carbonate filler may comprise limestone, ground silica, or other functionally equivalent minerals. The calcium carbonate filler increases the absorption of the membrane. The membrane in this example also includes a fumed silica filler, which adds strength and support to the membrane. Other fillers or the user of recycled glass alone as a filler are possible in various examples.

An example white roof coating compound formulation with a Silicone polymer resin includes:

| Material Type | Material Name | Range % by Weight |
| --- | --- | --- |
| Polymer | Poly Dimethyl Siloxane | 30.00-35.00 |
| Crosslinker | Methyl tris(MEKO) Silane | 1.50-2.00 |
| Filler | Calcium Carbonate | 30.00-33.00 |
| Filler | Recycled Glass | 20.00-23.00 |
| Filler | Fumed Silica | 0.50-1.00 |
| Pigment | Titanium Dioxide | 7.00-9.00 |
| Plasticizer | Poly Dimethyl Siloxane | 9.00-11.00 |
| Moisture Control | Vinyltrimethoxysilane | 0.75-1.00 |
| Adhesion Promoter | N(beta-aminoethyl) Gammaaminopropyltrimethoxysilane | 1.00-2.00 |
| Catalyst | Dibutyltin Dilaurate | 0.01-0.03 |
| Polymer | Poly Dimethyl Siloxane | 4.00-5.00 |

An example white roof coating compound formulation with a Silanol-Terminated Silicone polymer resin includes:

| Material Type | Material Name | % Wt. | % Volume |
| --- | --- | --- | --- |
| Polymer | Poly Dimethyl Siloxane | 33.72 | 49.00 |
| Crosslinker | Methyl tris(MEKO) Silane | | |
| Filler | Calcium Carbonate | 20.07 | 10.54 |
| Filler | Recycled Glass | 20.07 | 10.99 |
| Filler | Fumed Silica | 0.58 | 0.43 |
| Pigment | Titanium Dioxide | 7.59 | 2.70 |
| Plasticizer | Poly Dimethyl Siloxane | 10.03 | 14.88 |
| Moisture Control | Vinyltrimethoxysilane | 0.84 | 1.24 |
| Adhesion Promoter | N(beta-aminoethyl) Gammaaminopropyltrimethoxysilane | 1.18 | 1.63 |
| Catalyst | Dibutyltin Dilaurate | 0.01 | 0.01 |
| Polymer | Poly Dimethyl Siloxane | 4.22 | 6.12 |

In at least one embodiment of this example, the viscosity of the membrane is between 6000 and 7000 penetration units and the weight per gallon is between 11.50 and 12.00.

It will, of course, be understood that, although particular embodiments have just been described, the claimed subject matter is not limited in scope to a particular embodiment or implementation. Likewise, an embodiment may be implemented in any combination of compositions of matter, apparatuses, methods or products made by a process, for example.

The invention claimed is:

1. A moisture-cured membrane composition of matter comprising:
   a polymer resin binder; and
   recycled fused glass.

2. The composition of matter of claim 1, the recycled fused glass comprising an amount of substantially between 20-25% by weight of the composition.

3. The composition of matter of claim 1, the recycled fused glass having a particle size of substantially between 3 and 20 microns.

4. The composition of matter of claim 1, the polymer resin binder selected from the group consisting of a Silane-Terminated Poly Ether (STPE) polymer, a Silylated Polyurethane (SPUR) polymer, a Poly Dimethyl Siloxane (Silicone) polymer, and a methyldimethoxysilylpropyloxy-terminated polyoxypropylene polymer.

5. The composition of matter of claim 1, said composition having substantially 75% greater tensile strength than a composition of matter comprising a polymer resin binder and a silica selected from the group consisting of silicon dioxide, aluminum silicate, fumed silica, precipitated silica, sand, glass bubbles, glass beads, glass balloons, and glass fibers.

6. The composition of matter of claim 1, said composition having greater moisture resistance than a composition of matter comprising a polymer resin binder and a silica that is not recycled fused glass.

7. The composition of matter of claim 1, said composition having a higher insulating property than a composition of matter comprising a polymer resin binder and a silica that is not recycled fused glass.

8. The composition of matter of claim 1, said composition having higher UV protection than a composition of matter comprising a polymer resin binder and a silica selected from the group consisting of silicon dioxide, aluminum silicate, fumed silica, precipitated silica, sand, glass bubbles, glass beads, glass balloons, and glass fibers.

9. The composition of matter of claim 1, said composition does not contain any solvent.

10. The composition of matter of claim 1, said composition does not release any volatile organic compounds into the air while drying.

11. The composition of claim 1, said composition having stronger affinity between the polymer resin binder and the recycled fused glass than a composition of matter of a polymer resin binder and a silica that is not recycled fused glass, so that the cohesiveness of the polymer resin binder to the recycled fused glass is more uniform than that of the composition of matter of polymer resin binder and silica that is not recycled fused glass.

12. The composition of matter of claim 1, said composition comprising a roof coating, said composition comprising between about 26-45% by weight of the polymer resin binder and between about 20-25% by weight of the recycled fused glass, said composition further comprising between about 20-35% by weight of a calcium carbonate filler, between about 2-11% by weight of a plasticizer, between about 2-9% by weight of a pigment, between about 0.25-3% by weight of an adhesion promoter, and between about 0.01-0.4% by weight of a catalyst.

13. The composition of matter of claim 1, said composition comprising a patching compound, said composition comprising between about 30-35% by weight of the polymer resin binder and between about 20-25% by weight of the recycled fused glass, said composition further comprising between about 0.5-1% by weight of a rheology modifier, between about 20-35% by weight of a calcium carbonate filler, between about 2-9% by weight of a plasticizer, between about 1-8% by weight of a pigment, between about 0.25-3% by weight of an adhesion promoter, and between about 0.01-0.4% by weight of a catalyst.

14. The composition of matter of claim 1, said composition comprising a sealant, said composition comprising between about 30-38% by weight of the polymer resin binder and between about 20-27% by weight of the recycled fused glass, said composition further comprising between about 0.5-2% by weight of a rheology modifier, between about 20-33% by weight of a calcium carbonate filler, between about 3-10% by weight of a plasticizer, between about 1-8% by weight of a pigment, between about 0.25-2.5% by weight of an adhesion promoter, and between about 0.01-0.3% by weight of a catalyst.

15. The composition of matter of claim 1, the polymer resin binder comprising a poly dimethyl siloxane in an amount of between about 30-35% by weight of the composition, and said recycled fused glass comprising between about 20-25% by weight of the composition.

16. The composition of matter of claim 1, the polymer resin binder comprising a silylated polyurethane in an amount of between about 30-45% by weight of the composition, said recycled fused glass comprising between about 20-25% by weight of the composition.

17. The composition of matter of claim 1, the polymer resin binder comprising a methyldimethoxysilylpropyloxy-terminated polyoxypropylene in an amount of between about 26-35% by weight of the composition, said recycled fused glass comprising between about 20-24% by weight of the composition.

18. The composition of matter of claim 1, the polymer resin binder comprising a silane-terminated polyether in an amount of between about 30-40% by weight of the composition, said recycled fused glass comprising between about 20-25% by weight of the composition.

* * * * *